US012632673B2

(12) United States Patent (10) Patent No.: US 12,632,673 B2
Barrow et al. (45) Date of Patent: May 19, 2026

(54) UTILIZING EMBEDDING-BASED CLAIM-RELATION GRAPHS FOR EFFICIENT SYNTOPICAL READING OF CONTENT COLLECTIONS

(71) Applicant: Adobe Inc., San Jose, CA (US)

(72) Inventors: Joseph Barrow, Alexandria, VA (US); Jennifer Healey, San Jose, CA (US); Franck Dernoncourt, Seattle, WA (US); Ani Nenkova, Philadelphia, PA (US); Vlad Morariu, Potomac, MD (US); Rajiv Jain, Falls Church, VA (US); Nedim Lipka, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 305 days.

(21) Appl. No.: 18/336,380

(22) Filed: Jun. 16, 2023

(65) Prior Publication Data

US 2024/0419921 A1     Dec. 19, 2024

(51) Int. Cl.
    G06F 40/40       (2020.01)
    G06F 40/205      (2020.01)
    G06V 30/19       (2022.01)
(52) U.S. Cl.
    CPC ............ G06F 40/40 (2020.01); G06F 40/205 (2020.01); G06V 30/19093 (2022.01)
(58) Field of Classification Search
    CPC ............................... G06F 40/40; G06F 40/205
    See application file for complete search history.

(56) References Cited

U.S. PATENT DOCUMENTS 9,842,166 B1 *  12/2017  Leviathan ........... G06F 16/9024
2015/0081724 A1 *  3/2015  Xu ....................... G06F 16/9024
                                                        707/749
(Continued)

OTHER PUBLICATIONS

Aaron Clauset, Mark EJ Newman, and Cristopher Moore. 2004. Finding community structure in very large networks. Physical review E, 70(6):066111.
(Continued)

*Primary Examiner* — Daniel C Washburn
*Assistant Examiner* — Paul J. Mueller
(74) *Attorney, Agent, or Firm* — Keller Preece PLLC

(57) ABSTRACT

This disclosure describes one or more implementations of systems, non-transitory computer-readable media, and methods that extract viewpoints from content for syntopical reading using an efficient claim-relation graph construction approach. For example, the disclosed systems utilize sentence transformers with claims from content to embed the claims within a metric space (as claim nodes). Furthermore, in some embodiments, the disclosed systems generate a claim relation graph for the claims by utilizing approximate nearest neighbor searches to determine relational edges between a claim node and the claim node's approximate nearest neighbors. Moreover, in some implementations, the disclosed systems utilize the claim relation graph with an edge weighted graph neural network to determine stance labels during extraction of viewpoints (e.g., stance, aspect, and topic) for the claims. Additionally, in one or more instances, the disclosed systems utilize the extracted viewpoints in content retrieval applications (e.g., viewpoint ranked search results and/or socially contextualized claims).

20 Claims, 20 Drawing Sheets

(56) References Cited

U.S. PATENT DOCUMENTS

| | | | | |
|---|---|---|---|---|
| 2019/0362012 A1* | 11/2019 | Teregowda | ........... | G06F 16/248 |
| 2020/0257850 A1* | 8/2020 | Carbune | .............. | G06F 40/295 |
| 2022/0165364 A1* | 5/2022 | Qiao | ...................... | G16C 20/70 |
| 2023/0033114 A1 | 2/2023 | Barrow et al. | | |
| 2023/0169527 A1* | 6/2023 | Morningstar | ...... | G06Q 30/0203 |
| | | | | 705/7.32 |
| 2023/0214754 A1* | 7/2023 | Eidelman | ......... | G06Q 10/06375 |
| | | | | 705/7.37 |
| 2023/0401430 A1* | 12/2023 | Zheng | .................. | G06N 3/0455 |
| 2023/0419045 A1* | 12/2023 | Feng | ....................... | G06F 40/35 |
| 2024/0135086 A1* | 4/2024 | Wolkoff | .................. | G06F 40/30 |
| 2024/0256619 A1* | 8/2024 | Noskov | ............... | G06F 16/9024 |

OTHER PUBLICATIONS

Abeer Aldayel and Walid Magdy. 2019. Your stance is exposed! analysing possible factors for stance detection on social media. Proceedings of the ACM on Human-Computer Interaction, 3(CSCW):1-20.

Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary DeVito, Martin Raison, Alykhan Tejani, Sasank Chilamkurthy, Benoit Steiner, Lu Fang, Junjie Bai, and Soumith Chintala. 2019. Pytorch: An imperative style, high-performance deep learning library. In H. Wallach, H. Larochelle, A. Beygelzimer, F. d' Alche-Buc, E. Fox, and R. Garnett, editors, Advances in Neural Information Processing Systems 32, pp. 8024-8035. Curran Associates, Inc.

Adina Williams, Nikita Nangia, and Samuel Bowman. 2018. A broad-coverage challenge corpus for sentence understanding through inference. In Proceedings of the 2018 Conference of the North American 1594 Chapter of the Association for Computational Linguistics: Human Language Technologies, vol. 1 (Long Papers), pp. 1112-1122. Association for Computational Linguistics.

Amita Misra, Pranav Anand, Jean E. Fox Tree, and Marilyn Walker. 2015. Using summarization to discover argument facets in online idealogical dialog. In Proceedings of the 2015 Conference of the North American Chapter of the Association for Computational Linguistics: Human Language Technologies, pp. 430-440, Denver, Colorado. Association for Computational Linguistics.

Andreas Peldszus and Manfred Stede. 2015. Joint prediction in MST-style discourse parsing for argumentation mining. In Proceedings of the 2015 Conference on Empirical Methods in Natural Language 1593 Processing, pp. 938-948, Lisbon, Portugal. Association for Computational Linguistics.

Barrow et al., Syntopical Graphs for Computational Argumentation Tasks, Proceedings of the 59th Annual Meeting of the Association for Computational Linguistics and the 11th International Joint Conference on Natural Language Processing, pp. 1583-1595, Aug. 1-6, 2021.

Benjamin Schiller, Johannes Daxenberger, and Iryna Gurevych. 2020. Stance detection benchmark: How robust is your stance detection? CoRR, abs/2001.01565.

Bill Dolan, Chris Quirk, and Chris Brockett. 2004. Unsupervised construction of large paraphrase corpora: Exploiting massively parallel news sources. In COLING 2004: Proceedings of the 20th International Conference on Computational Linguistics, pp. 350-356, Geneva, Switzerland. COLING.

Bowen Zhang, Min Yang, Xutao Li, Yunming Ye, Xiaofei Xu, and Kuai Dai. 2020. Enhancing crosstarget stance detection with transferable semantic emotion knowledge. In Proceedings of the 58th Annual Meeting of the Association for Computational Linguistics, pp. 3188-3197.

Chang Li, Aldo Porco, and Dan Goldwasser. 2018. Structured representation learning for online debate stance prediction. In Proceedings of the 27th International Conference on Computational Linguistics, pp. 3728-3739, Santa Fe, New Mexico, USA. Association for Computational Linguistics.

Charlie Egan, Advaith Siddharthan, and Adam Wyner. 2016. Summarising the points made in online political debates. In Proceedings of the Third Workshop on Argument Mining (ArgMining2016), pp. 134-143, Berlin, Germany. Association for Computational Linguistics.

Christian Stab, Tristan Miller, Benjamin Schiller, Pranav Rai, and Iryna Gurevych. 2018. Crosstopic argument mining from heterogeneous sources. In Proceedings of the 2018 Conference on Empirical Methods in Natural Language Processing, pp. 3664-3674, Brussels, Belgium. Association for Computational Linguistics.

David M Blei, Andrew Y Ng, and Michael I Jordan. 2003. Latent dirichlet allocation. the Journal of machine Learning research, 3:993-1022.

David Vilares and Yulan He. 2017. Detecting perspectives in political debates. In Proceedings of the 2017 Conference on Empirical Methods in Natural Language Processing, pp. 1573-1582, Copenhagen, Denmark. Association for Computational Linguistics.

David Wadden, Shanchuan Lin, Kyle Lo, Lucy Lu Wang, Madeleine van Zuylen, Arman Cohan, and Hannaneh Hajishirzi. 2020. Fact or Fiction: Verifying Scientific Claims. In Proceedings of the 2020 Conference on Empirical Methods in Natural Language Processing (EMNLP), pp. 7534-7550, Online. Association for Computational Linguistics.

Debela Gemechu and Chris Reed. 2019. Decompositional argument mining: A general purpose approach for argument graph construction. In Proceedings of the 57th Annual Meeting of the Association for Computational Linguistics, pp. 516-526, Florence, Italy. Association for Computational Linguistics.

Dhanya Sridhar, James Foulds, Bert Huang, Lise Getoor, and Marilyn Walker. 2015. Joint models of disagreement and stance in online debate. In Proceedings of the 53rd Annual Meeting of the Association for Computational Linguistics and the 7th International Joint Conference on Natural Language Processing (vol. 1: Long Papers), pp. 116-125, Beijing, China. Association for Computational Linguistics.

Dietrich Trautmann. 2020. Aspect-based argument mining. In Proceedings of the 7th Workshop on Argument Mining, pp. 41-52, Online. Association for Computational Linguistics.

Enrique Amigo, Julio Gonzalo, Javier Artiles, and Felisa Verdejo. 2009. A comparison of extrinsic clustering evaluation metrics based on formal constraints. Information retrieval, 12(4):461-486.

Esin Durmus, Faisal Ladhak, and Claire Cardie. 2019. Determining relative argument specificity and stance for complex argumentative structures. In Proceedings of the 57th Annual Meeting of the Association for Computational Linguistics, pp. 4630-4641, Florence, Italy. Association for Computational Linguistics.

Henning Wachsmuth, Benno Stein, and Yamen Ajjour. 2017b. "pageRank" for argument relevance. In Proceedings of the 15th Conference of the European Chapter of the Association for Computational Linguistics: vol. 1, Long Papers, pp. 1117-1127. Association for Computational Linguistics.

Henning Wachsmuth, Martin Potthast, Khalid Al-Khatib, Yamen Ajjour, Jana Puschmann, Jiani Qu, Jonas Dorsch, Viorel Morari, Janek Bevendorff, and Benno Stein. 2017a. Building an argument search engine for the web. In Proceedings of the 4th Workshop on Argument Mining, pp. 49-59. Association for Computational Linguistics.

Ivan Habernal and Iryna Gurevych. 2015. Exploiting Debate Portals for Semi-Supervised Argumentation Mining in User-Generated Web Discourse. In Proceedings of the 2015 Conference on Empirical Methods in Natural Language Processing, pp. 2127-2137, Lisbon, Portugal. Association for Computational Linguistics.

Ivan Habernal and Iryna Gurevych. 2016. What makes a convincing argument? Empirical analysis and detecting attributes of convincingness in Web argumentation. In Proceedings of the 2016 Conference on Empirical Methods in Natural Language Processing, pp. 1214-1223, Austin, Texas. Association for Computational Linguistics.

Jacob Devlin et al., BERT: Pre-training of Deep Bidirectional Transformers for Language Understanding, 2018.

James Thorne, Andreas Vlachos, Christos Christodoulopoulos, and Arpit Mittal. 2018. FEVER: a Large-scale Dataset for Fact Extraction and VERification. In Proceedings of the 2018 Conference of the

(56)           References Cited

OTHER PUBLICATIONS

North American Chapter of the Association for Computational Linguistics: Human Language Technologies, vol. 1 (Long Papers), pp. 809-819, New Orleans, Louisiana. Association for Computational Linguistics.
John Lawrence and Chris Reed. 2017. Using complex argumentative interactions to reconstruct the argumentative structure of large-scale debates. In Proceedings of the 4th Workshop on Argument Mining, pp. 108-117, Copenhagen, Denmark. Association for Computational Linguistics.
John X. Morris, Eli Lifland, Jin Yong Yoo, Jake Grigsby, Di Jin, and Yanjun Qi. 2020. Textattack: A framework for adversarial attacks, data augmentation, and adversarial training in NLP.
Jonathan Kobbe, Ioana Hulpus, , and Heiner Stuckenschmidt. 2020. Unsupervised stance detection for arguments from consequences. In Proceedings of the 2020 Conference on Empirical Methods in Natural Language Processing (EMNLP), pp. 50-60.
Kazi Saidul Hasan and Vincent Ng. 2013. Stance classification of ideological debates: Data, models, features, and constraints. In Proceedings of the Sixth International Joint Conference on Natural Language Processing, pp. 1348-1356, Nagoya, Japan. Asian Federation of Natural Language Processing.
Khalid Al-Khatib, Yufang Hou, Henning Wachsmuth, Charles Jochim, Francesca Bonin, and Benno Stein. 2020. End-to-end argumentation knowledge graph construction. In Proceedings of the Thirty-Fourth AAAI Conference on Artificial Intelligence, pp. 7367-7374. AAAI.
Liang Yao, Chengsheng Mao, and Yuan Luo. 2019. Graph convolutional networks for text classification. In Proceedings of the AAAI Conference on Artificial Intelligence, vol. 33, pp. 7370-7377.
Manfred Stede and Jodi Schneider. 2018. Argumentation Mining. Number 40 in Synthesis Lectures on Human Language Technologies. Morgan & Claypool.
Michael Schlichtkrull, Thomas N Kipf, Peter Bloem, Rianne Van Den Berg, Ivan Titov, and Max Welling. 2018. Modeling relational data with graph convolutional networks. In European semantic web conference, pp. 593-607. Springer.
Minghui Qiu and Jing Jiang. 2013. A latent variable model for viewpoint discovery from threaded forum posts. In Proceedings of the 2013 Conference of the North American Chapter of the Association for Computational Linguistics: Human Language Technologies, pp. 1031-1040, Atlanta, Georgia. Association for Computational Linguistics.
Minjie Wang, Da Zheng, Zihao Ye, Quan Gan, Mufei Li, Xiang Song, Jinjing Zhou, Chao Ma, Lingfan Yu, Yu Gai, Tianjun Xiao, Tong He, George Karypis, Jinyang Li, and Zheng Zhang. 2019. Deep graph library: A graph-centric, highly-performant package for graph neural networks. arXiv preprint arXiv:1909.01315.
Mortimer J Adler and Charles Van Doren. 1940. How To Read A Book. Simon and Schuster, New York.
Nils Reimers, Benjamin Schiller, Tilman Beck, Johannes Daxenberger, Christian Stab, and Iryna Gurevych. 2019b. Classification and clustering of arguments with contextualized word embeddings. In Proceedings of the 57th Annual Meeting of the Association for Computational Linguistics, pp. 567-578, Florence, Italy. Association for Computational Linguistics.
Orith Toledo-Ronen, Roy Bar-Haim, and Noam Slonim. 2016. Expert stance graphs for computational argumentation. In Proceedings of the Third Workshop on Argument Mining (ArgMining2016), pp. 119-123, Berlin, Germany. Association for Computational Linguistics.

Ramit Sawhney, Arnav Wadhwa, Shivam Agarwal, and Rajiv Ratn Shah. 2020. GPolS: A contextual graph-based language model for analyzing parliamentary debates and political cohesion. In Proceedings of the 28th International Conference on Computational Linguistics, pp. 4847-4859, Barcelona, Spain (Online). International Committee on Computational Linguistics.
Reimers et al., Sentence-BERT: Sentence embeddings using siamese BERT-networks, 2019 Conference on Empirical Methods in Natural Language Processing, Aug. 27, 2019.
Roberts K, Demner-Fushman D, Voorhees EM, Bedrick S, Hersh WR. Overview of the TREC 2020 Precision Medicine Track. Text Retr Conf. Nov. 2020; 1266: https://trec.nist.gov/pubs/trec29/papers/OVERVIEW.PM.pdf. PMID: 34849513; PMCID: PMC8629152.
Roy Bar-Haim, Indrajit Bhattacharya, Francesco Dinuzzo, Amrita Saha, and Noam Slonim. 2017a. Stance classification of context-dependent claims. In Proceedings of the 15th Conference of the European Chapter of the Association for Computational Linguistics: vol. 1, Long Papers, pp. 251-261, Valencia, Spain. Association for Computational Linguistics.
Roy Bar-Haim, Lilach Edelstein, Charles Jochim, and Noam Slonim. 2017b. Improving claim stance classification with lexical knowledge expansion and context utilization. In Proceedings of the 4th Workshop on Argument Mining, pp. 32-38, Copenhagen, Denmark. Association for Computational Linguistics.
Roy Bar-Haim, Yoav Kantor, Lilach Eden, Roni Friedman, Dan Lahav, and Noam Slonim. 2020. Quantitative argument summarization and beyond: Crossdomain key point analysis. In Proceedings of the 2020 Conference on Empirical Methods in Natural Language Processing (EMNLP), pp. 39-49, Online. Association for Computational Linguistics.
Sarvesh Ranade, Rajeev Sangal, and Radhika Mamidi. 2013. Stance classification in online debates by recognizing users' intentions. In Proceedings of the SIGDIAL 2013 Conference, pp. 61-69, Metz, France. Association for Computational Linguistics.
Schiller et al. in Stance Detection Benchmark: How Robust is Your Stance Detection?, Künstl Intell 35, 329-341 (2021).
Sihao Chen, Daniel Khashabi, Chris Callison-Burch, and Dan Roth. 2019. PerspectroScope: A window to the world of diverse perspectives. In Proceedings of the 57th Annual Meeting of the Association for Computational Linguistics: System Demonstrations, pp. 129-134, Florence, Italy. Association for Computational Linguistics.
Swapna Somasundaran and Janyce Wiebe. 2009. Recognizing stances in online debates. In Proceedings of the Joint Conference of the 47th Annual Meeting of the ACL and the 4th International Joint Conference on Natural Language Processing of the AFNLP, pp. 226-234, Suntec, Singapore. Association for Computational Linguistics.
Yamen Ajjour, Milad Alshomary, Henning Wachsmuth, and Benno Stein. 2019. Modeling frames in argumentation. In Proceedings of the 2019 Conference on Empirical Methods in Natural Language Processing and the 9th International Joint Conference on Natural Language Processing (EMNLPIJCNLP), pp. 2922-2932, Hong Kong, China. Association for Computational Linguistics.
Mnhan Liu, Myle Ott, Naman Goyal, Jingfei Du, Mandar Joshi, Danqi Chen, Omer Levy, Mike Lewis, Luke Zettlemoyer, and Veselin Stoyanov. 2019. RoBERTa: A robustly optimized BERT pretraining approach. arXiv preprint arXiv:1907.11692.
Yuxiao Lin, Yuxian Meng, Xiaofei Sun, Qinghong Han, Kun Kuang, Jiwei Li, and Fei Wu. 2021. BertGCN: Transductive text classification by combining GCN and BERT. arXiv preprint arXiv:2105.05727.

* cited by examiner

Macro-Averaged $F_1$ by Dataset.

| Node Encoder | C-R Graph | GNN | ibm | sem | sed | iac | rum | arg | per | arc | sno | fnc | avg | shaded avg |
|---|---|---|---|---|---|---|---|---|---|---|---|---|---|---|
| BERT Large | - | - | 0.707* | 0.688 | 0.621 | 0.333 | 0.565 | 0.602 | 0.848 | 0.632 | 0.731 | 0.769 | 0.652 | 0.709 |
| MT-DNN (multitask) | - | - | 0.777 | 0.698 | 0.644 | 0.380 | 0.573 | 0.617 | 0.837 | 0.653 | 0.733 | 0.752 | 0.669 | 0.728 |
| RoBERTa Base | - | - | 0.769 | 0.679 | 0.604 | 0.353 | 0.601 | 0.618 | 0.809 | 0.603 | 0.739 | 0.704 | 0.648 | 0.708 |
| RoBERTa Base MNLI | - | - | 0.780 | 0.699 | 0.583 | 0.351 | 0.575 | 0.634 | 0.840 | 0.644 | 0.745 | 0.793 | 0.664 | 0.718 |
| RoBERTa Base MNLI | sentence | R-GCN | 0.807 | 0.702 | 0.635 | 0.465* | 0.580 | 0.667 | 0.806 | 0.666 | 0.731 | 0.754 | 0.689 | 0.745 |
| RoBERTa Base MNLI | cross | R-GCN | 0.841 | 0.698 | dnf | dnf | dnf | dnf | dnf | dnf | dnf | dnf | - | - |
| RoBERTa Large | - | - | 0.855 | 0.737 | 0.609 | 0.375 | 0.560 | 0.660 | 0.905 | 0.680 | 0.770 | 0.799 | 0.685 | 0.739 |
| RoBERTa Large MNLI | - | - | 0.868 | 0.737 | 0.617 | 0.362 | 0.555 | 0.682 | 0.902 | 0.708 | 0.782 | 0.791 | 0.704 | 0.779 |
| RoBERTa Large MNLI | sentence | R-GCN | 0.909 | 0.732 | 0.702* | 0.404 | 0.570 | 0.722 | 0.916 | 0.706 | 0.784 | 0.803* | 0.732 | 0.821 |
| RoBERTa Large MNLI | sentence | EGATv2 | 0.909 | 0.752* | 0.689 | 0.392 | 0.607* | 0.798* | 0.924* | 0.712* | 0.802* | 0.739 | 0.734 | 0.824 |
| RoBERTa Large MNLI | cross | R-GCN | 0.911* | 0.745 | dnf | dnf | dnf | dnf | dnf | dnf | dnf | dnf | - | - |

*Fig. 17*

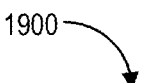
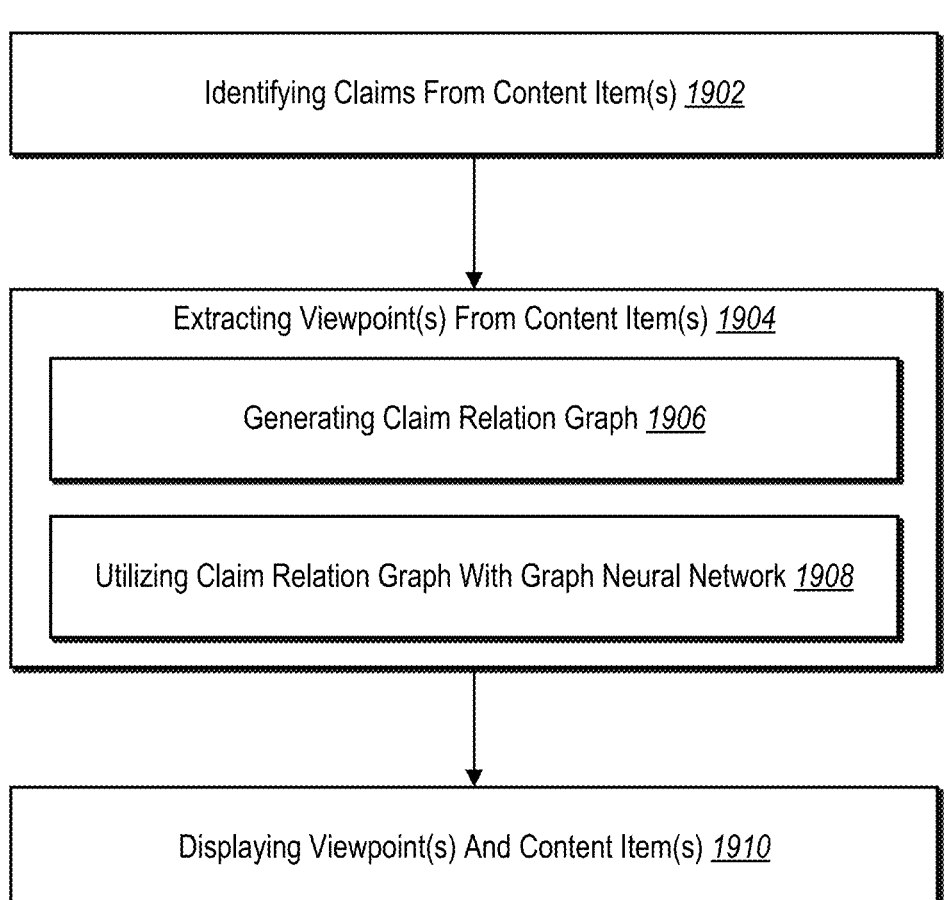
1900
Identifying Claims From Content Item(s) *1902*
Extracting Viewpoint(s) From Content Item(s) *1904*
Generating Claim Relation Graph *1906*
Utilizing Claim Relation Graph With Graph Neural Network *1908*
Displaying Viewpoint(s) And Content Item(s) *1910*
*Fig. 19*

UTILIZING EMBEDDING-BASED CLAIM-RELATION GRAPHS FOR EFFICIENT SYNTOPICAL READING OF CONTENT COLLECTIONS

BACKGROUND

Recent years have seen in an increase in the utilization of machine learning to analyze digital content. For example, individuals and businesses increasingly utilize digital content analysis systems to evaluate aspects of digital documents (or text) to perform computer-based syntopical readings of digital documents and further detect viewpoints within the digital documents. In order to perform a syntopical reading of digital documents and to detect viewpoints from content of the digital documents, many conventional systems utilize various natural language processing models and classification neural network models with the digital documents. Although such conventional systems evaluate aspects of digital documents (or text) to perform computer-based syntopical readings of digital documents, many of these conventional systems have a number of shortcomings, particularly with regards to the efficiency and the flexibility of accurately performing syntopical readings of digital documents to determine viewpoints from the digital documents.

SUMMARY

This disclosure describes one or more implementations of systems, non-transitory computer-readable media, and methods that solve one or more of the foregoing problems by extracting cross-content viewpoints from a content collection for syntopical reading using an efficient claim-relation graph construction approach. In particular, in one or more implementations, the disclosed systems utilize sentence transformers with claims identified in a collection of content to embed the claims within a metric space as embedded claim nodes. Furthermore, in one or more embodiments, the disclosed systems speed up construction of a claim relation graph for the claims identified in the content collection by utilizing approximate nearest neighbor searches to determine relationships between an embedded claim node and the embedded claim node's approximate nearest neighbors. For instance, the disclosed systems generate vectors between the claim node and its approximate nearest neighbors to represent relationships between the claim nodes (as edges of the claim relation graph). Moreover, in one or more implementations, the disclosed systems utilize the claim relation graph with an edge weighted graph neural network to determine stance labels during extraction of viewpoints (e.g., stance, aspect, and topic) for the claims from the collection of content. Indeed, due to the efficient speedup of constructing claim relation graphs through the above-mentioned approach, the disclosed systems practically utilize the extracted viewpoints in content retrieval (e.g., to present viewpoints as part of a search result and/or to socially contextualize claims in digital content).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description is described with reference to the accompanying drawings in which:

FIG. 17 illustrates experimental benchmarks of an implementation of a digital syntopical reading system and various baseline models.

FIG. 19 illustrates a flowchart of a series of acts for extracting cross-content viewpoints from a content collection for syntopical reading using an efficient claim-relation graph construction approach in accordance with one or more implementations.

DETAILED DESCRIPTION

Figure 1:
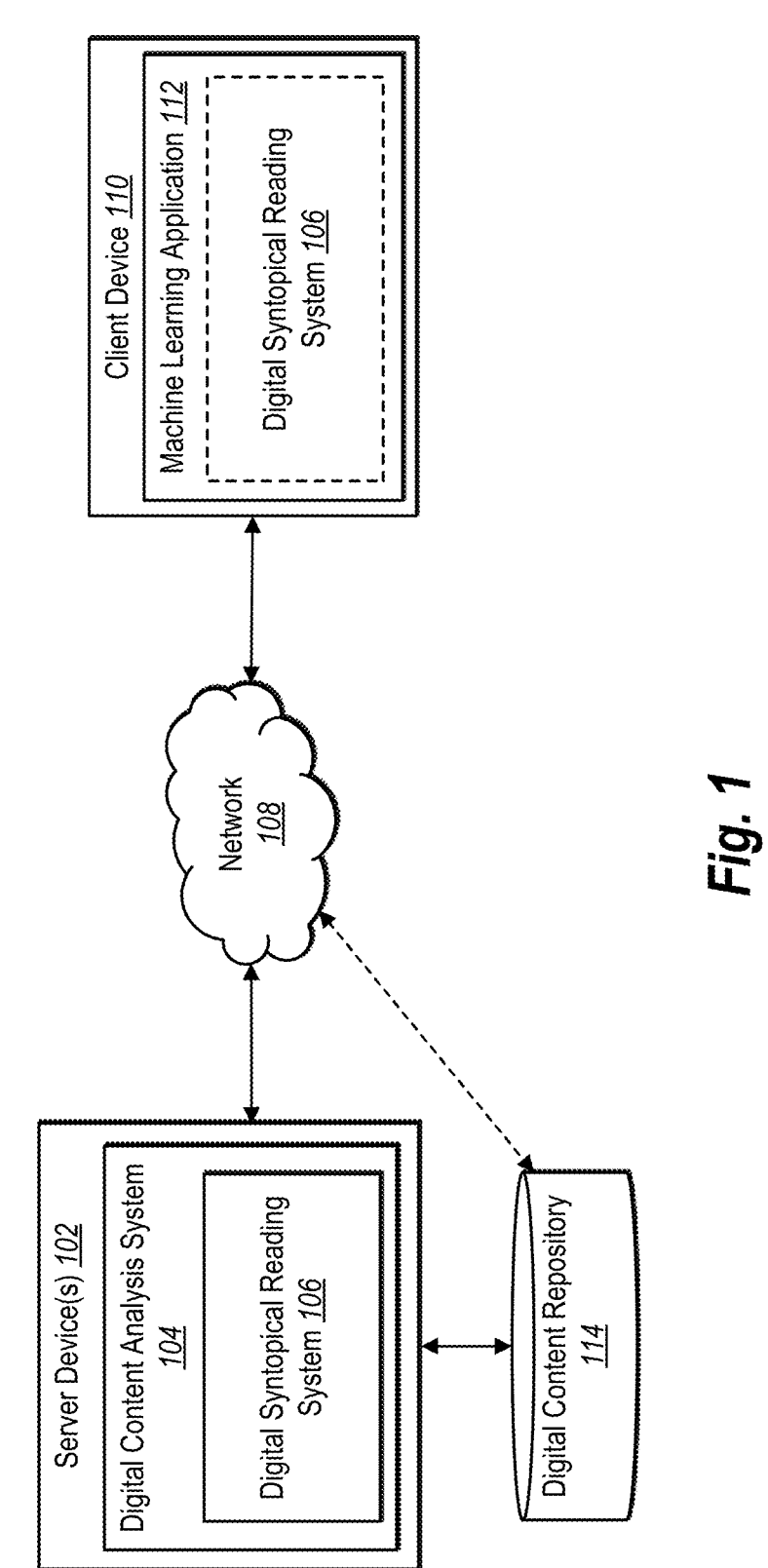
FIG. 1 illustrates a schematic diagram of an example environment in which a digital syntopical reading system operates in accordance with one or more implementations.

This disclosure describes one or more implementations of a digital syntopical reading system that efficiently generates a claim relation graph using metric space embedding and approximate nearest neighbor searches for viewpoint reconstruction from a collection of content. For example, the digital syntopical reading system utilizes sentence transformers with claims identified in a collection of content to embed the claims within a metric space. Moreover, in one or more embodiments, the digital syntopical reading system generates a claim relation graph for the claims identified in the content collection by determining relationships between an embedded claim and the embedded claim's approximate nearest neighbors (e.g., using vector-based edges). In addition, the digital syntopical reading system extracts viewpoints for the claims by utilizing the claim relation graph. For instance, the digital syntopical reading system utilizes an edge weighted graph neural network with attention transformers to determine stances for claims. In some instances, the digital syntopical reading system utilizes the extracted viewpoints from the efficient claim relation graph in content retrieval applications. For example, the digital syntopical reading system provides content ranked based on the viewpoints in response to a search query (e.g., to present viewpoints with the search results) and/or to socially contextualize claims from digital content to present viewpoints from social media posts in relation to claims in the digital content.

To illustrate, in one or more embodiments, the digital syntopical reading system identifies claims (as sentences) from a collection of content (e.g., documents, articles, text, transcripts). Additionally, in one or more implementations, the digital syntopical reading system utilizes sentence transformers to encode individual sentences (e.g., claims) in a metric space. Indeed, in one or more instances, the digital syntopical reading system utilizes the metric space to capture vector similarity relations between the encoded claims (as claim nodes). Moreover, in one or more implementations, the digital syntopical reading system also receives a query (e.g., a search query, a topic selection, content selection, identified claims within a digital content item) and encodes the query within the metric space using sentence transformers.

Furthermore, in one or more implementations, the digital syntopical reading system generates a claim relation graph for the claims from the content collection by determining relationships between the claim nodes within the metric space. For instance, the digital syntopical reading system utilizes vector similarity measures between the encoded claims to capture a relationship between the encoded claims. Indeed, to capture relationships, the digital syntopical reading system generates graph edges within the metric space using a vector similarity operation to determine whether an edge should exist between claim nodes and a weight for the particular edge. In one or more instances, the digital syntopical reading system also generates graph edges within the metric spaces between claim nodes and an encoded query.

Additionally, in one or more embodiments, the digital syntopical reading system utilizes approximate nearest neighbor searches to determine relationships between claims in a metric space for the claim relation graph. For instance, the digital syntopical reading system utilizes approximate nearest neighbor searches to identify neighboring nodes of a claim node within the metric space. Subsequently, the digital syntopical reading system determines relationship graph edges (as described herein) between a claim node and its approximate nearest neighboring nodes to reduce the number of relation judgement operations and the search space of possible neighbors for each claim node in the metric space. In addition, in one or more cases, the digital syntopical reading system also utilizes approximate nearest neighbor searches to determine graph edges within the metric spaces between an encoded query and the encoded query's approximate nearest neighboring claim nodes in the metric space.

Furthermore, in one or more implementations, the digital syntopical reading system utilizes a deep graph neural network with the claim relation graph for viewpoint reconstruction. For instance, the digital syntopical reading system utilizes the claim relation graph with a graph neural network to determine a stance label for a claim within the content collection for viewpoint extraction. For example, the digital syntopical reading system utilizes an edge weighted graph neural network with the vector-based edges the claim relation graph to detect a stance classification for a claim node. Furthermore, the digital syntopical reading system further determines an aspect label for a claim node through aspect clustering. In addition, in one or more embodiments, the digital syntopical reading system also utilizes clustering and ranking to identify a central claim node for the claim node and utilizes the central claim node as a topic for the claim node. Indeed, in one or more instances, the digital syntopical reading system utilizes the determined stance, aspect, and topic as a viewpoint (e.g., stance, aspect, and topic) for the claim within the content collection.

In one or more embodiments, the digital syntopical reading system improves the speed for claim relation graph construction and viewpoint extraction for digital content items by using sentence transformers to encode claims within a metric space, approximate nearest neighbor searches during claim relation graph construction, and edge weighted graph neural networks for viewpoint reconstruction. Additionally, due to this speed improvement, the digital syntopical reading system enables the use of viewpoint reconstruction for digital content in real-word (e.g., near real-time) applications, such as, but not limited to, balanced searches of digital content and socially contextualized reading. For example, the digital syntopical reading system provides digital content in response to a search query ranked based on extracted viewpoints and with viewpoint information to balance the search results according to the extracted viewpoints. Additionally, in some cases, the digital syntopical reading system socially contextualizes claims from a digital content (e.g., an actively viewed electronic document or article) by utilizing the claims as queries to extract related viewpoints from social media posts.

As mentioned above, conventional systems suffer from a number of technical deficiencies. For instance, conventional content analysis systems are unable to obtain accurate viewpoint extraction results without being computationally inefficient. To illustrate, many conventional content analysis systems utilize natural language processing (NLP) to extract viewpoints from digital content. However, many conventional natural language processing systems are unable to accurately identify an overall viewpoint of digital content (or documents).

Furthermore, some conventional systems utilize claim relation graphs and graph convolutional networks for accurate viewpoint reconstruction. However, to achieve accurate results, such conventional systems are computationally expensive and time consuming. For example, some conventional systems utilize encoders for pairwise relationship inferences to create claim relation graphs with an exponential complexity (e.g., in some cases resulting in hours of computation time for inferences). In addition, such conventional systems also perform multiple pairwise judgements (for multiple relationship types) between every claim instance to generate a claim relation graph. Oftentimes, these conventional systems utilize days or hours of computational time with larger content collections to determine such pairwise judgements.

In addition to the computational time and resources for constructing a claim relation graph, such conventional systems also utilize inefficient neural network classification models to extract viewpoints from claim relation graphs. For instance, some conventional systems utilize stacked graphs (for the multiple pairwise judgements) with neural network classification models to extract viewpoints from claim relation graphs. Due to the stacked graphs, such neural network classification models are often computationally expensive, larger in size, and time intensive.

Due to the time limitations introduced by the computational inefficiencies described above, many conventional systems are inflexibly limited in use after performing viewpoint extraction from digital content. To illustrate, in many cases, conventional systems are unable to apply viewpoint extraction results to real-world or near-real time applications because claim relation graph construction and extraction of the viewpoint using neural network classification models may take multiple hours (or days). Accordingly, the use cases of many conventional systems are limited to non-real time applications.

The digital syntopical reading system provides a number of advantages relative to these conventional systems. For instance, unlike conventional systems that are computationally and time inefficient, the digital syntopical reading system speeds up relation claim graph construction with a nominal impact on accuracy. In particular, in one or more implementations, the digital syntopical reading system utilizes sentence transformers to run inferences once per claim to encode the claim within a metric space. Furthermore, in many instances, the digital syntopical reading system also determines pairwise relationships between claims by determining computationally inexpensive vector similarity operations between the claim nodes in the metric space. Additionally, in one or more implementations, the digital syntopical reading system further uses approximate nearest neighbor searches to reduce the search space of claim node neighbors (during claim graph construction and/or during queries).

Indeed, the digital syntopical reading system, by using the above-mentioned approaches, is able to construct relation claim graphs with a logarithmic complexity (instead of an exponential complexity). In some instances, the digital syntopical reading system is able to generate a claim relation graph in seconds (e.g., a 400 time increase in speed compared to many conventional systems). In addition, the digital syntopical reading system is able to gain this improvement in speed without compromising the accuracy of the claim relation graph and/or subsequently extracted viewpoints (as described below).

In addition, the digital syntopical reading system also utilizes an edge weighted graph neural network that is more efficient in comparison to many conventional systems. In particular, unlike conventional systems that utilize computationally expensive stacked graphs with neural network classification models, the digital syntopical reading system utilizes an edge weighted graph neural network to efficiently determine stance labels for viewpoint extraction through weighted vector edges in the metric space-based claim relation graph. Furthermore, the digital syntopical reading system also utilizes layer normalization, attention-head projection, attention normalization, and classification layers with the edge weighted graph neural network to reduce noisy and/or highly stochastic training.

As mentioned above, the digital syntopical reading system achieves improved speeds for claim relation graph construction and viewpoint extraction for digital content items (e.g., a speed up by 400 times) by using sentence transformers to encode claims within a metric space, approximate nearest neighbor searches during claim relation graph construction, and edge weighted graph neural networks for viewpoint reconstruction. In many cases, unlike many conventional systems, the digital syntopical reading system is more flexible due to this improvement in speed. For instance, the digital syntopical reading system enables the use of viewpoint reconstruction for digital content in real-word (e.g., near real-time) applications, such as, but not limited to, balanced searches of digital content and socially contextualized reading due to the improved speed.

Turning now to the figures, FIG. 1 illustrates a schematic diagram of one or more implementations of a system 100 (or environment) in which a digital syntopical reading system operates in accordance with one or more implementations. As illustrated in FIG. 1, the system 100 includes a server device(s) 102, a network 108, a client device 110, and a digital content repository 114. As further illustrated in FIG. 1, the server device(s) 102, the client device 110, and the digital content repository 114 communicate via the network 108.

In one or more implementations, the server device(s) 102 includes, but is not limited to, a computing (or computer) device (as explained below with reference to FIG. 20). As shown in FIG. 1, the server device(s) 102 include a digital content analysis system 104 which further includes the digital syntopical reading system 106. The digital content analysis system 104 can generate, train, store, deploy, and/or utilize various computer-based models to analyze digital content, such as, but not limited to electronic documents, website articles, social media posts, text-based messages, and/or transcripts to perform various acts on the digital content, such as, but not limited to, retrieving the digital content as search results, annotating the digital content, and/or classifying the digital content.

Moreover, as explained below, the digital syntopical reading system 106, in one or more embodiments, extracts cross-content viewpoints from a content collection for syntopical reading using an efficient claim-relation graph construction approach. In some implementations, the digital syntopical reading system 106 efficiently generates a claim relation graph using metric space embedding and approximate nearest neighbor searches for viewpoint reconstruction from a collection of content (as described herein). Furthermore, the digital syntopical reading system 106 utilizes the extracted viewpoints from the efficient claim relation graph in content retrieval applications, such as, but not limited to, balanced searches of digital content and socially contextualized reading.

Moreover, as shown in FIG. 1, the system 100 includes the digital content repository 114. In some cases, the digital content repository 114 includes various combinations of computing devices, storage server devices, and/or applications that manage, share, and/or store digital content. For instance, the digital content repository 114 includes digital content available (or accessible) on the world-wide-web and/or an intranet network. Indeed, in some cases the digital content repository 114 includes, but is not limited to, a computing device, including those explained below with reference to FIG. 20.

In one or more embodiments, digital content (sometimes referred to as "digital content item") includes information in the form of digital data. For example, digital content (or a digital content item) includes text in digital mediums (or depicted within a digital medium, such as through a scan). In some cases, digital content includes electronic text documents, such as, but not limited to, PDFs, websites, eBooks, blogs, spreadsheets, and/or word processor documents. In addition, in one or more embodiments, digital content includes social media posts, such as, comments, reviews, e-commerce feedback, statuses, and/or social feed posts. Furthermore, in some instances, digital content includes digital media transcriptions, such as, but not limited to, transcriptions from audio files (or streams) and/or transcriptions from video files (or streams).

Furthermore, as shown in FIG. 1, the system 100 includes the client device 110. In one or more implementations, the client device 110 includes, but is not limited to, a mobile device (e.g., smartphone, tablet), a laptop, a desktop, or any other type of computing device, including those explained below with reference to FIG. 20. In certain implementations, although not shown in FIG. 1, the client device 110 is operated by a user to perform a variety of functions (e.g., via the digital content analysis application 112). For example, the client device 110 performs functions such as, but not limited to, creating, providing, and/or uploading digital content, displaying digital content, providing a query for digital content retrieval, and/or providing requests for information on a digital content (e.g., viewpoint data, related digital content data). Additionally, although FIG. 1 illustrates a single client device, the system 100, in some instances, includes various numbers of client devices communicating with the server device(s) 102 (in accordance with one or more embodiments herein).

To access the functionalities of the digital syntopical reading system 106 (as described above), in one or more implementations, a user interacts with the digital content analysis application 112 on the client device 110. For example, the digital content analysis application 112 includes one or more software applications installed on the client device 110 (e.g., to upload digital content, view digital content, and/or provide a query for a digital content search request in accordance with one or more implementations herein). In some cases, the digital content analysis application 112 is hosted on the server device(s) 102. In addition, when hosted on the server device(s) 102, the digital content analysis application 112 is accessed by the client device 110 through a web browser and/or another online interfacing platform and/or tool.

Although FIG. 1 illustrates the digital syntopical reading system 106 being implemented by a particular component and/or device within the system 100 (e.g., the server device(s) 102), in some implementations, the digital syntopical reading system 106 is implemented, in whole or in part, by other computing devices and/or components in the system 100. For example, in some implementations, the digital syntopical reading system 106 is implemented on the client device 110 within the digital content analysis application 112 (e.g., via a digital syntopical reading system 106). Indeed, in one or more implementations, the description of (and acts performed by) the digital syntopical reading system 106 are implemented (or performed by) the digital syntopical reading system 106 when the client device 110 implements the digital syntopical reading system 106. More specifically, in some instances, the client device 110 (via an implementation of the digital syntopical reading system 106 on the digital syntopical reading system 106) efficiently generates a claim relation graph using metric space embedding and approximate nearest neighbor searches for viewpoint reconstruction from a collection of content (as described herein).

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 20. Furthermore, although FIG. 1 illustrates the server device(s) 102, the client device 110, and/or the digital content repository 114 communicating via the network 108, in certain implementations, the various components of the system 100 communicate and/or interact via other methods (e.g., the server device(s) 102 and the client device 110 communicating directly or the server device(s) 102 and the digital content repository 114 communicating directly).

Figure 2:
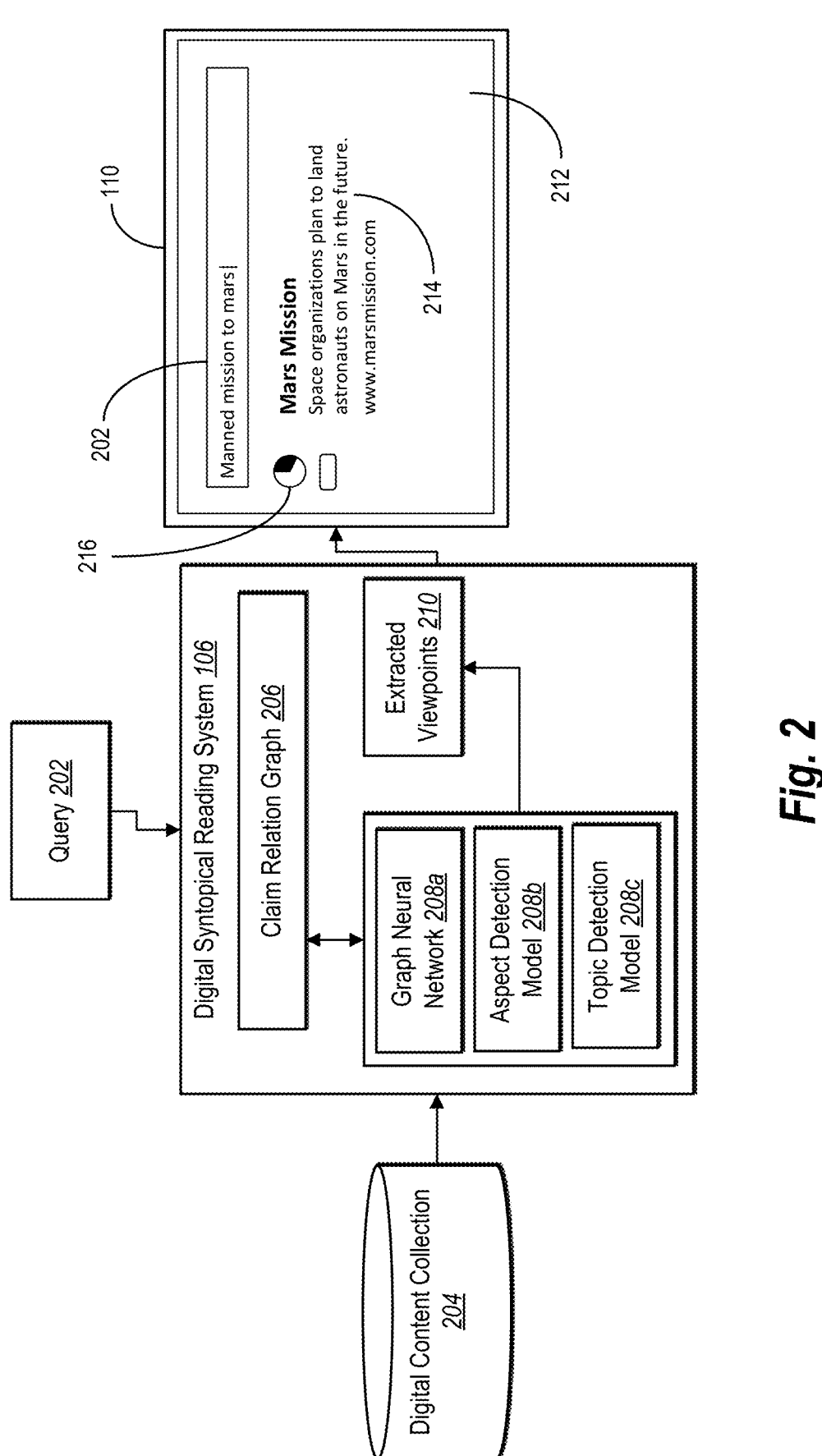
FIG. 2 illustrates an exemplary flow of a digital syntopical reading system extracting viewpoints from content to utilize the viewpoints in a content retrieval application in accordance with one or more implementations.

As mentioned above, in one or more embodiments, the digital syntopical reading system 106 extracts cross-content viewpoints from a content collection for syntopical reading to utilize the cross-content viewpoints in various content retrieval applications. For instance, FIG. 2 illustrates an exemplary flow of the digital syntopical reading system 106 extracting cross-content viewpoints from a content collection to utilize the cross-content viewpoints in a content retrieval application. In particular, FIG. 2 illustrates an example of the digital syntopical reading system 106 extracting cross-content viewpoints to retrieve content in response to a search query (e.g., for a balanced search).

As shown in FIG. 2, the digital syntopical reading system 106 receives a query 202 from a client device (e.g., the client device 110). For example, a query includes a request for data via an input. In some instances, a query includes text input that requests data (or information), a text selection to request information for the selection (e.g., a topic selection, a statement selection), and/or text utilized as input for a content retrieval application. For instance, a query includes a search engine text input requesting content items. Additionally, a query includes a topic or aspect selection. Moreover, in some cases, a query includes one or more statements from content items utilized as input for a content retrieval application (e.g., social contextualization as described below).

In response to receiving the query 202, the digital syntopical reading system 106 accesses a digital content collection 204 to retrieve digital content items for the query 202. In some cases, the digital syntopical reading system 106 indexes the digital content items within the digital content collection 204 for searching. Indeed, in one or more instances, the digital syntopical reading system 106 extracts claims (e.g., sentences) from digital content within the digital content collection 204. For example, a claim includes a thought, argument, statement, and/or assertion conveyed via text and/or verbal communication. In some instances, a claim includes a sentence(s) within digital content that portrays or conveys a thought, argument, statement, and/or assertion.

In some embodiments, the digital syntopical reading system 106 utilizes sentence transformers with the extracted claims to capture different possible relationships of the claims and the corresponding digital content items. In one or more instances, the digital syntopical reading system 106 utilizes the captured relationships from the digital content items with the query 202 to identify relevant digital content items for the query 202. In one or more embodiments, the digital syntopical reading system 106 receives the query 202 and utilizes the query 202 to generate a claim relation graph. For instance, the digital syntopical reading system 106 retrieves relevant claims from the digital content repository 114 and computes the relevant claims' relationships with each other and the query (using approximate nearest neighbor searches as described herein) to generate a claim-relation graph.

To illustrate, as shown in FIG. 2, the digital syntopical reading system 106 utilizes the digital content items from the digital content collection 204 with the query 202 to generate a claim relation graph 206 (in accordance with one or more implementations herein). For instance, a claim relation graph includes a graph that models salient interactions of various claims in relation to various topics. In one or more implementations, a claim relation graph includes claims as nodes (e.g., claim nodes) and edges that represent one or more interactions between the claim nodes. Indeed, in one or more cases, the digital syntopical reading system 106 constructs edges of a claim relation graph utilizing pairwise scoring functions (e.g., pretrained textual entailment, paraphrase models) and/or vector similarity operations (e.g., cosine similarity) to represent pairwise relationships between claims. In one or more embodiments, the edges of a claim relation graph represent various relationships between claims (e.g., entailments, contradictions, topic similarities, paraphrases, argumentative support, argumentative rebuttal). Indeed, a claim relation graph includes claim nodes and one or more edges between claim nodes to model relationships between claims (e.g., via singular weighted edges, multiple weighted edges).

Furthermore, as shown in FIG. 2, the digital syntopical reading system 106 utilizes the claim relation graph 206 with a graph neural network 208a, aspect detection model 208b, and a topic detection model 208c to extract viewpoints (e.g., extracted viewpoints 210). In one or more embodiments, a graph neural network includes a machine learning model that utilizes supervised and/or unsupervised learning to evaluate relationships represented within a claim relation graph to determine stance labels for claims in context to the digital content items (to form viewpoints and/or summarization from the claims). Furthermore, in some instances, the graph neural network includes a machine learning model (e.g., the aspect detection model 208b) that utilizes supervised and/or unsupervised learning to detect aspects and/or topics to form viewpoints for the claims in context to the digital content items. For instance, a graph neural network includes, but is not limited to, relational convolutional neural networks and/or edge-weighted graph neural networks (e.g., edge-weighted graph attention transformers).

In one or more instances, a neural network refers to a machine-learning model that is trained and/or tuned based on inputs to determine classifications or approximate unknown functions. For example, a neural network includes a model of interconnected artificial neurons (e.g., organized in layers) that communicate and learn to approximate complex functions and generate outputs (e.g., viewpoint aspect classifications, viewpoint stance classifications) based on a plurality of inputs provided to the neural network. In some cases, a neural network refers to an algorithm (or set of algorithms) that implements deep learning techniques to model high-level abstractions in data. For example, a neural network includes a convolutional neural network (CNN), a recurrent neural network (RNN), and/or attention transformers.

As shown in FIG. 2, the digital syntopical reading system 106 utilizes the graph neural network 208a with the claim relation graph 206 to extract (or determine) the extracted viewpoints 210 for claims corresponding to content items from the digital content collection 204. In particular, in one or more instances, the digital syntopical reading system 106 utilizes an edge weighted graph neural network to determine a stance for a claim from the claim relation graph. Furthermore, in one or more embodiments, the digital syntopical reading system 106 utilizes the aspect detection model 208b and the topic detection model 208c to detect an aspect and a topic for the claim. Indeed, in one or more instances, the extracted viewpoints 210 include topics, aspects, and stances from the claims (e.g., sentences) within content items from the digital content collection 204. To illustrate, in one or more embodiments, a viewpoint of a digital content item represents (or conveys) a stance of the digital content item towards an aspect of a topic. Indeed, in one or more instances, the viewpoint is represented through statements (or claims) from one or more digital content items.

Furthermore, in one or more embodiments, an aspect of a digital content item includes a concept related to a topic identified from claims in a digital content item. For example, an aspect includes a focused facet of a topic (e.g., a sub-topic). In some cases, a digital content item includes multiple conclusions (via claims) which are grouped based on relating to a same aspect of a topic discussed in the multiple conclusions. As an example, two statements (or claims) from a digital content item may include "nuclear energy emits zero $CO_2$" and "nuclear can provide a clean baseload, eliminating the need for fracking and coal mining." In one or more cases, the digital syntopical reading system 106 groups the above-mentioned claims as relating to the aspect: "the environmental impact of nuclear energy." In some instances, an aspect focuses on geographical area, a time frame, and/or a particular demographic (within a topic from one or more claims).

Additionally, in one or more instances, a stance includes an attitude or position conveyed towards an aspect of a topic (for a claim). In one or more embodiments, the digital syntopical reading system 106 determines a positive or negative stance of a claim towards an aspect determined from the claim. For instance, for the two example statements above (related to nuclear energy), the digital syntopical reading system 106 determines a positive stance towards the impact of nuclear energy on environment. In one or more instances, in reference to the two example statements above, the digital syntopical reading system 106 determines a viewpoint that includes support for nuclear energy (as the topic) based on a positive view (e.g., the stance) of the environmental impact of nuclear energy (e.g., the aspect).

Moreover, as shown in FIG. 2, the digital syntopical reading system 106 utilizes the extracted viewpoints 210 to perform a content retrieval for the query 202 (e.g., "manned mission to mars"). In some cases, the digital syntopical reading system 106 utilizes the extracted viewpoints 210 to rank the content items for the content retrieval for the query 202. In particular, as shown in FIG. 2, the digital syntopical reading system 106 displays, within a graphical user interface 212 of a client device (e.g., client device 110), a representation of a content item 214 and viewpoint information 216 for the content item (as a search result). For instance, as shown in FIG. 2, the digital syntopical reading system 106 displays the search result on the graphical user interface 212 with the representation of the content item 214 as a link to a web article related to the query 202 (e.g., manned mission to mars). Furthermore, as shown in FIG. 2, the digital syntopical reading system 106 displays the search result on the graphical user interface 212 with the viewpoint information 216 to indicate stance distributions associated with the content item (from the extracted viewpoints 210) and viewpoint coverage within the content item (e.g., a quantity of viewpoints associated with the content item).

Although FIG. 2 illustrates a search result with a representation of a content item and viewpoint information, the digital syntopical reading system 106, in one or more embodiments, displays various numbers of content item representations and various viewpoint information for the content items. In addition, in certain instances, the digital syntopical reading system 106 displays viewpoints corresponding to the content items (e.g., via stances, topics, aspects) for the content items. Indeed, in one or more instances, the digital syntopical reading system 106 utilizes the extracted viewpoints 210 for various content retrieval applications as described in greater detail below (e.g., in reference to FIGS. 10-15).

Figure 3:
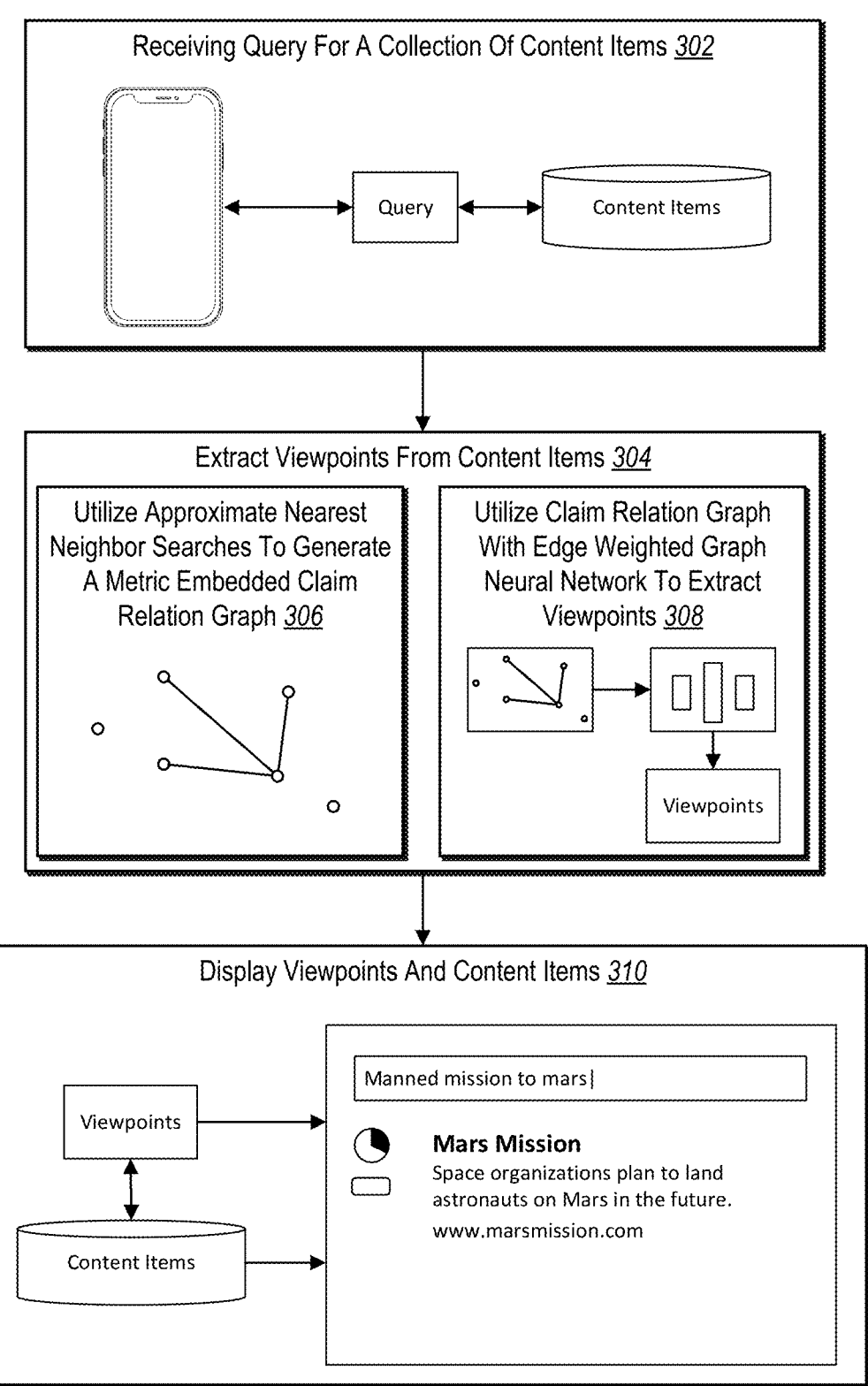
FIG. 3 illustrates an overview of the digital syntopical reading system extracting viewpoints from content using an efficient claim-relation graph construction approach with an edge weighted graph neural network in accordance with one or more implementations.

Moreover, as mentioned above, the digital syntopical reading system 106 efficiently generates a claim relation graph using metric space embedding and approximate nearest neighbor searches for viewpoint reconstruction from a collection of content. For example, FIG. 3 illustrates an overview of the digital syntopical reading system 106 extracting cross-content viewpoints from a content collection for syntopical reading using an efficient claim-relation graph construction approach with an edge weighted graph neural network. For instance, FIG. 3 illustrates the digital syntopical reading system 106 receiving a query for a collection of content items, extracting viewpoints from the content items (by utilizing approximate nearest neighbor searches with metric space embeddings to generate a claim relation graph and utilizing an edge weighted graph neural network), and displaying the extracted viewpoints and content items on a client device.

As shown in act 302 of FIG. 3, the digital syntopical reading system 106 receives a query for a collection of content items. In some cases, the digital syntopical reading system 106 receives a query from a client device via a search engine application for retrieving content items relevant to the query (on the client device). Furthermore, in some embodiments, the digital syntopical reading system 106 receives various claims from a digital content item (e.g., a digital content item displayed or read on a client device) as queries to retrieve information or commentary for the claims from another source (e.g., social media posts, other digital content items). Indeed, in one or more implementations, the digital syntopical reading system 106 receives a query for a collection of content items as described below (e.g., in reference to FIGS. 5 and 8-16).

Furthermore, as shown in act 304 of FIG. 3, the digital syntopical reading system 106 extracts viewpoints from content items (of the content item collection). For instance, as shown in FIG. 3, the act 304 includes the act 306 of utilizing approximate nearest neighbor searches to generate a claim relation graph from claims that are encoded within a metric space. Indeed, in one or more instances, the digital syntopical reading system 106 utilizes approximate nearest neighbor searches and a metric space to generate a claim relation graph as described below (e.g., in reference to FIGS. 4 and 5). Additionally, as shown in FIG. 3, the act 304 includes the act 308 of utilizing the claim relation graph with an edge weighted graph neural network (with attention transformers) to extract stance labels for claims to form the viewpoints for the claims represented in the claim relation graph. Indeed, in one or more embodiments, the digital syntopical reading system 106 utilizes an edge weighted graph neural network to determine stance labels for viewpoints as described below (e.g., in reference to FIGS. 6 and 7).

Moreover, as shown in act 310 of FIG. 3, the digital syntopical reading system 106 displays viewpoints and content items within a client device (in response to the query). For example, the digital syntopical reading system 106 displays, as part of search results, relevant content items that are ranked based on viewpoints corresponding to the content items and with viewpoint information (e.g., viewpoint coverage statistics, stance statistics for claims in the digital content items). Indeed, the digital syntopical reading system 106 utilizing extracted viewpoints in various content retrieval applications is described in greater detail below (e.g., in reference to FIGS. 8-16).

In one or more embodiments, the digital syntopical reading system 106 utilizes various components described herein in combination with various components described in Joseph Barrow et. al., Syntopical Reading for Collection Understanding, U.S. patent application Ser. No. 17/384,136 (filed Jul. 23, 2021), the entire contents of which are hereby incorporated by reference (hereinafter Barrow). For example, in some cases, the digital syntopical reading system 106 generates a claim relation graph using claim embeddings and nearest approximate neighbor searches (in accordance with one or more implementations herein) while utilizing graph neural networks to determine viewpoints for claims as described in Barrow. In some instances, the digital syntopical reading system 106 extracts claims from content items as described in Barrow and further utilizes the claims to generate a claim relation graph using claim embeddings and nearest approximate neighbor searches (in accordance with one or more implementations herein) and extract viewpoints using an edge weighted graph neural network with attention transformers (in accordance with one or more implementations herein).

Figure 4:
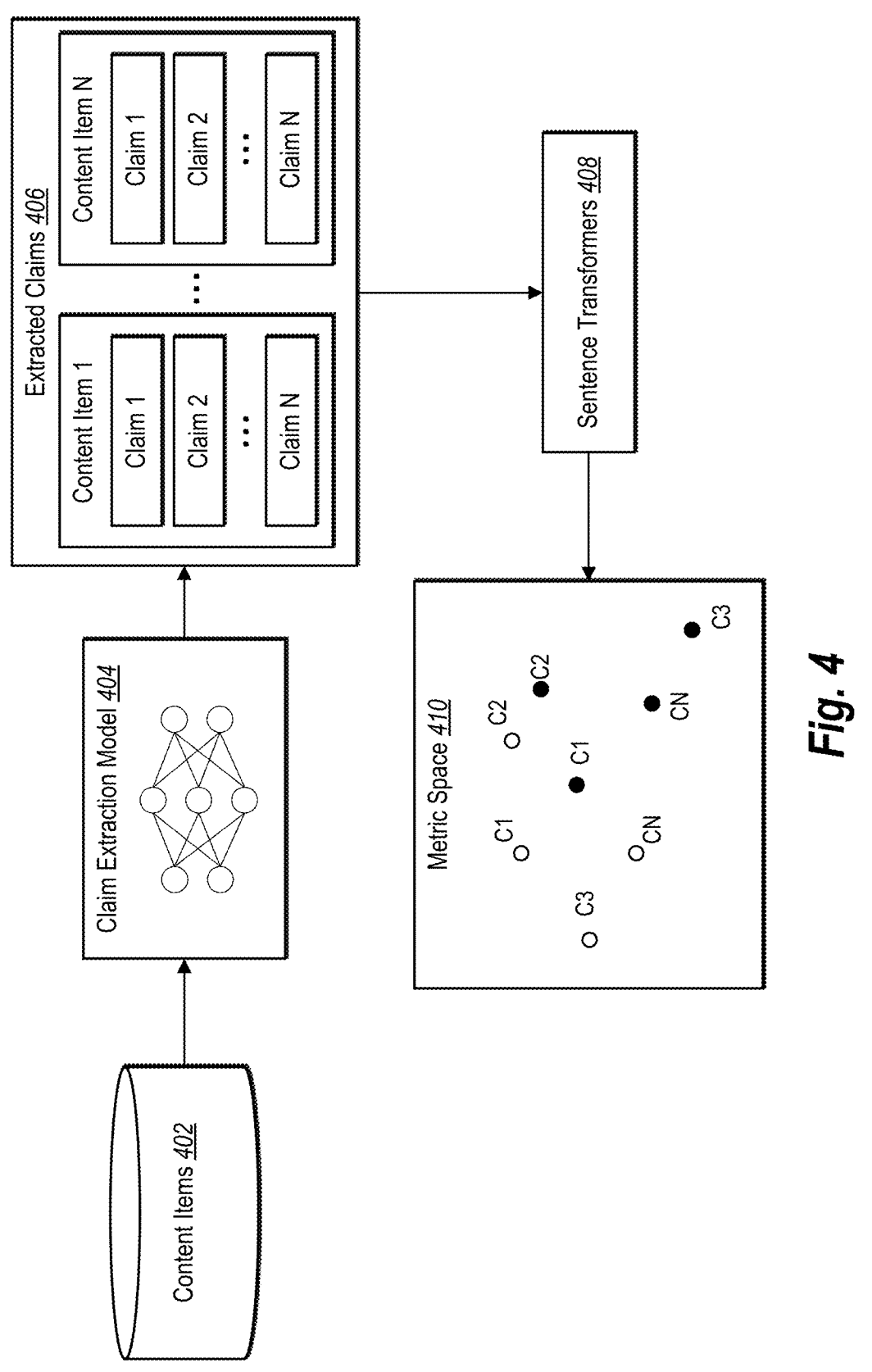
FIG. 4 illustrates a digital syntopical reading system embedding claims within a metric space in accordance with one or more implementations.

As mentioned above, in one or more embodiments, the digital syntopical reading system 106 utilizes sentence transformers with claims identified in a collection of content to embed the claims within a metric space as embedded claim nodes. For instance, FIG. 4 illustrates the digital syntopical reading system 106 embedding claims within a metric space. In particular, FIG. 4 illustrates the digital syntopical reading system 106 identifying claims from content items (in a collection of content items) and further embedding the claims within a metric space.

For instance, as shown in FIG. 4, the digital syntopical reading system 106 identifies content items 402 (from a collection of content items) and utilizes a claim extraction model 404 to identify the extracted claims 406 (e.g., claims 1-N for a content item 1 to claims 1-N for a content item N). Indeed, in some cases, the digital syntopical reading system 106 utilizes a claim extraction model trained to detect claims from one or more digital content items. In some embodiments, the digital syntopical reading system 106 utilizes a dataset of sentences annotated as a claim arguing for a topic and/or a claim arguing against a topic to train the claim extraction model to identify a claim arguing for a topic and/or a claim arguing against a topic. Furthermore, in some instances, the digital syntopical reading system 106 utilizes a dataset of sentences annotated as a relevant and/or irrelevant claim for a topic to train the claim extraction model to identify a relevant and/or irrelevant claim from the sentences. In some instances, the training dataset for the claim extraction model is split across multiple topics. Moreover, in one or more implementations, the digital syntopical reading system 106 utilizes the claim extraction model to identify relevant claims, irrelevant claims, claims arguing against a topic, and/or claims arguing for a topic from sentences of one or more digital content items.

In some instances, the digital syntopical reading system 106 utilizes a natural language processor, as the claim extraction model, to identify sentences within content items and parses the sentences as claims. In some embodiments, the digital syntopical reading system 106 utilizes the claim extraction model to extract various sentences from digital content items as individual claims. Indeed, in some instances, the digital syntopical reading system 106 utilizes a claim extraction model that utilizes a machine learning-based natural language processor and/or a linguistic-based natural language processor.

Furthermore, as shown in FIG. 4, the digital syntopical reading system 106 utilizes the extracted claims 406 with sentence transformers 408 to embed the claims within a metric space 410. In particular, in one or more embodiments, the digital syntopical reading system 106 embeds claims in a metric space as nodes to determine relationships between the claim nodes to generate a claim relation graph. As mentioned above, in many cases, the digital syntopical reading system 106 quickly and efficiently constructs claim relation graphs for claims from digital content items using sentence encoder-based metric space embeddings in comparison to many conventional cross-encoder-based models that predict specific relation types between claims.

In some cases, as shown in FIG. 4, the digital syntopical reading system 106 generates the metric space 410 to include claim nodes from various digital content items. For example, in the metric space 410, the shaded claim nodes represent claims from a first digital content item and the non-shaded claim nodes represent claims from a second digital content item. Indeed, the digital syntopical reading system 106 can embed various numbers of claim nodes from various digital content items within the metric space 410.

To illustrate, in one or more embodiments, the digital syntopical reading system 106 utilizes sentence transformers to encode claims in a metric space. In some embodiments, the digital syntopical reading system 106 trains sentence transformers to (or utilizes sentence transformers trained to) encode individual sentences (e.g., claims) in a metric space such that vector similarity measures between the embedded sentences capture meaningful relationships. For example, a metric space includes an abstract set (as a vector space) having points (as nodes) and a notion of distance between the points. Indeed, in one or more embodiments, the digital syntopical reading system 106 utilizes a distance between points (e.g., claim nodes) in a metric space to define (or determine) relationships between the points (e.g., relations or similarities between claim nodes). Additionally, in one or more instances, a claim node includes a claim (or sentence) embedded within a metric space as a point (and/or vector) utilizing a sentence transformer.

Furthermore, in one or more embodiments, a sentence transformer(s) includes a language model that derives (semantic) sentence embeddings from sentences (for a metric space). In some cases, a sentence transformer(s) derives sentence embeddings that are comparable using vector similarity operations (within a metric space). For instance, a sentence transformer includes a Bidirectional Encoder Representations from Transformers (BERT) model trained to derive sentence embeddings to embed sentences within a metric space. In some cases, the sentence transformer includes various language models, such as, but not limited to, BERT models, neural word embedding models, and/or global vector models. In one or more embodiments, the digital syntopical reading system 106 utilizes sentence transformers as described by Reiners et al.in Sentence-BERT: Sentence Embeddings using Siamese BERT-Networks, 2019 Conference on Empirical Methods in Natural Language Processing, available at https://arxiv.org/pdf/ 1908.10084.pdf, (2019), the entire content of which is hereby incorporated by reference in its entirety. Alternatively, the digital syntopical reading system 106 utilizes sentence transformers as described by Jacob Devlin et al., BERT: *Pre-training of Deep Bidirectional Transformers for Language Understanding*, 2018, https://arxiv.org/abs/ 1810.04805, which is incorporated herein by reference in its entirety.

In some embodiments, the digital syntopical reading system 106 encodes a claim as a vector using a pretrained transformer to generate a vector per claim. For instance, the digital syntopical reading system 106 utilizes a sentence transformer to encode a topic and a claim (e.g., text of a topic and text of a claim) as a representative node [CLS] in accordance with the following function:

$$[CLS] \text{ topic } [SEP] \text{ claim} \tag{1}$$

Figure 5:
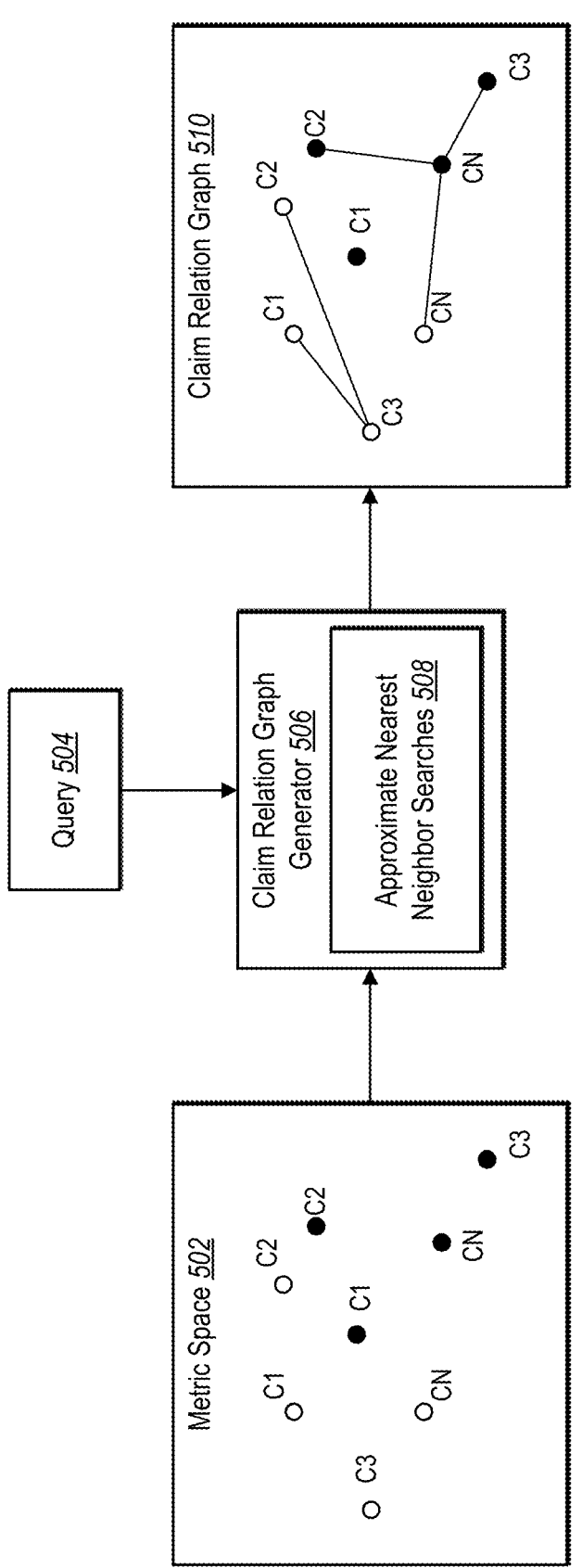
FIG. 5 illustrates a digital syntopical reading system generating a claim relation graph using approximate nearest searches in accordance with one or more implementations.

Furthermore, as mentioned above, the digital syntopical reading system 106 utilizes the claim nodes in a metric space and approximate nearest neighbor searches to generate a claim relation graph. For example, FIG. 5 illustrates the digital syntopical reading system 106 generating a claim relation graph using approximate nearest searches. Indeed, FIG. 5 illustrates the digital syntopical reading system 106 generating a claim relation graph using approximate nearest searches to determine relationships between claim nodes in a metric space (and/or a query).

Indeed, as shown in FIG. 5, the digital syntopical reading system 106 utilizes a metric space 502 with a claim relation graph generator 506 to generate a claim relation graph 510. In particular, the digital syntopical reading system 106 utilizes the claim relation graph generator 506 to identify approximate nearest neighbors for claim nodes within the metric space 502 using the approximate nearest neighbor searches 508. Furthermore, the digital syntopical reading system 106 utilizes the claim relation graph generator 506 to determine vector similarity measures (or distances) between claim nodes and the claim nodes' approximate nearest neighboring claim nodes (as edges) to generate the claim relation graph 510.

For example, as shown in FIG. 5, the digital syntopical reading system 106 determines edges (or relationships) between subsets of claim nodes in the metric space 502 using the approximate nearest neighbor searches 508. In particular, the digital syntopical reading system 106 utilizes the approximate nearest neighbor searches 508 to determine approximate nearest neighbors of a claim node (which, in some cases, is a subset of the claim nodes in the metric space 502). Subsequently, as shown in the claim relation graph 510, the digital syntopical reading system 106 determines edges (e.g., using similarity distance measures of the claim nodes in the metric space 502) between the subset of claim nodes (e.g., instead of performing a pairwise relationship judgement on every combination of claim nodes within the metric space 502).

As also shown in FIG. 5, the digital syntopical reading system 106 generates a claim relation graph 510 that determines relationships (as edges) between claim nodes from various digital content items. For example, in the claim relation graph 510, the shaded claim nodes represent claims from a first digital content item and the non-shaded claim nodes represent claims from a second digital content item. As further shown in the claim relation graph 510, the digital syntopical reading system 106 determines relationships (as edges) between non-shaded claim nodes (from a second digital content item) and shaded claim nodes (from a first digital content item).

Additionally, in some instances, the digital syntopical reading system 106 further reduces the search space of the metric space 502 during claim relation graph construction by utilizing approximate nearest neighbor searches 508 to determine relationships between claim nodes in relevance to a query 504. For instance, the digital syntopical reading system 106 identifies claim nodes within the metric space 502 that relevant to the query 504. In some implementations, the digital syntopical reading system 106 embeds the query 504 within the metric space 502 (e.g., using sentence transformers) and, subsequently, determines relationships (as edges between) a subset of claim nodes that are approximate nearest neighbors with a node of the embedded query. Furthermore, in one or more embodiments, the digital syntopical reading system 106 determines relationships (as edges based on similarity measures) between the claim nodes and other claim nodes that are approximate nearest neighbors with a node of the embedded query.

As mentioned above, the digital syntopical reading system 106 utilizes a similarity measure (e.g., a vector similarity operation) to determine relationships between claim nodes in a metric space (e.g., to generate a claim relation graph). In one or more embodiments, the digital syntopical reading system 106 determines a distance metric between claim nodes (as vectors) to measure similarities and/or dissimilarities between the claim nodes. To illustrate, in some instances, the digital syntopical reading system 106 determines pairwise cosine similarities between claim nodes (e.g., as vectors) in the metric space to determine the relationships (e.g., similarities and/or dissimilarities) between the claim nodes. In some cases, the digital syntopical reading system 106 utilizes various vector similarity operations to determine various distance metrics, such as, but not limited to, Euclidean distances and/or Manhattan distances between claim nodes in a metric space.

In some implementations, the digital syntopical reading system 106 determines distance metrics (e.g., cosine similarities, Euclidean distances, Manhattan distances) as edge weights between the claim nodes in the metric space. For example, in some cases, the digital syntopical reading system 106 utilizes edge weights bounded between 0 and 1 from cosine similarities between the claim nodes. Indeed, in one or more embodiments, the digital syntopical reading system 106 utilizes the edge weights to indicate a similarity and/or dissimilarity between claim nodes within a metric space.

Furthermore, in one or more embodiments, the digital syntopical reading system 106 utilizes approximate nearest neighbor searches to generate the claim relation graph. In particular, in one or more implementations, the digital syntopical reading system 106 utilizes a nearest neighbor search algorithm to identify nearest neighboring claim nodes to a claim node within a metric space to establish (or determine) relationships between the claim nodes for the claim relation graph. For example, the digital syntopical reading system 106 utilizes (approximated) nearest neighbor searching algorithms, such as, but not limited to, greedy searches, and/or k-nearest neighbor searches.

In one or more embodiments, the digital syntopical reading system 106 generates edges (or weighted edges) between a claim node and a subset of claim nodes embedded within the metric space that are nearest neighbors to the claim node. For instance, as shown in FIG. 5, the digital syntopical reading system 106 generates weighted edges (e.g., vector similarity distances) between approximate nearest neighboring claim nodes within the claim relation graph 510. In some instances, the digital syntopical reading system 106 reduces the number of vector pairwise relation judgements (e.g., vector similarity operations) to perform within a metric space by generating edges (or weighted edges) between a claim node and a subset of claim nodes embedded within the metric space that are nearest neighbors to the claim node.

In some implementations, the digital syntopical reading system 106 generates weighted edges between claim nodes and approximate nearest neighbor claim nodes of the claim node with relevancy to a query node (e.g., from an embedded query). For instance, in some instances, the digital syntopical reading system 106 generates edges for a query node and the query node's approximate nearest neighbor claim nodes (within the metric space). Indeed, in some instances, the digital syntopical reading system 106 generates a claim relation graph for a query by generating edges (e.g., using a vector similarity operation) for a query node and the query node's approximate nearest neighbor claim nodes (within the metric space).

Furthermore, in one or more embodiments, the digital syntopical reading system 106 generates a claim relation graph for a query by selecting a partial claim relation graph based on approximate nearest neighbor searches. In particular, in one or more embodiments, the digital syntopical reading system 106 identifies (or generates) a claim relation graph that includes weighted edges between embedded claim nodes and the embedded claim nodes' approximate nearest neighboring claim nodes as described herein. Subsequently, in one or more implementations, the digital syntopical reading system 106 utilizes an embedding of the query to perform an approximate nearest neighboring search to identify embedded claim nodes relevant to the embedded query. Furthermore, in one or more embodiments, the digital syntopical reading system 106 selects a portion of the claim relation graph (e.g., a subset of claim nodes from the claim relation graph) that includes the relevant embedded claim nodes (to the embedded query) and the relevant embedded claim nodes' weighted edges with other clam nodes (e.g., a reduced search space).

In some implementations, the digital syntopical reading system 106 utilizes a combination of sentence transformers (or encoders) and cross encoders to generate a claim relation graph (e.g., hybrid claim relation graph construction). For instance, the digital syntopical reading system 106 embeds claims within a metric space to identify, in relation to a claim node and/or a query node, a threshold number of neighboring claim nodes (e.g., a top k neighboring claim nodes). Then, the digital syntopical reading system 106 utilizes cross encoders (e.g., using one of various BERT models) to predict multi-edge relationships (e.g., paraphrase relations, topic similarity relations, entailment relations) between the top k neighboring claims to generate a claim relation graph. For example, in some cases, the digital syntopical reading system 106 predicts (or generates) multi-edge relationships between the top k neighboring claims using claim encoding as described in Joseph Barrow et. al., Syntopical Reading for Collection Understanding, U.S. patent application Ser. No. 17/384,136 (filed Jul. 23, 2021), and published as US 20230033114, the entire contents of which are hereby incorporated by reference (hereinafter Barrow).

Figure 6:
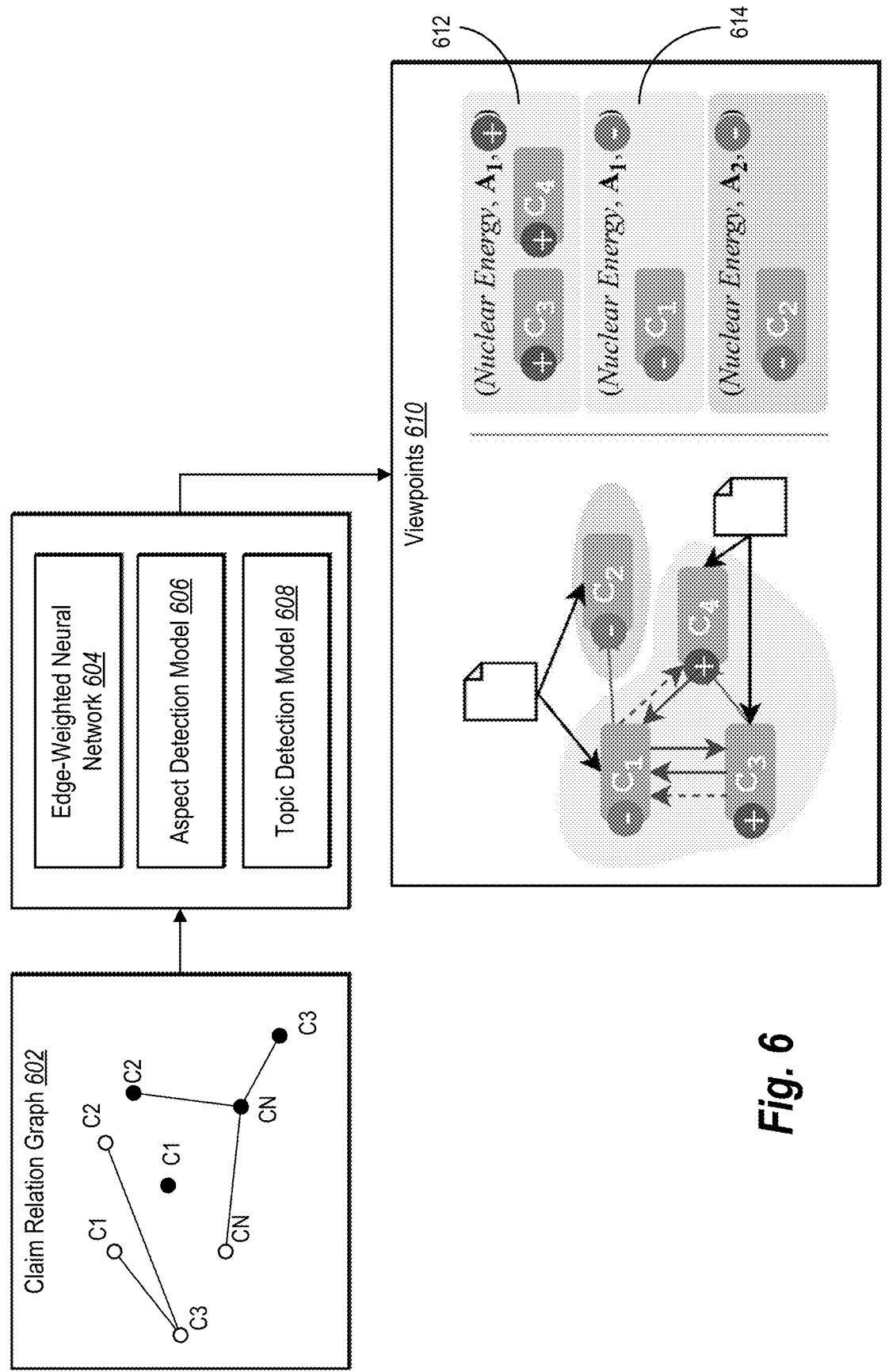
FIG. 6 illustrates a digital syntopical reading system extracting viewpoints for claims using a claim relation graph with an edge weighted graph neural network in accordance with one or more implementations.

As also mentioned above, the digital syntopical reading system 106 extracts viewpoints for claims by utilizing the claim relation graph with an edge weighted graph neural network. For instance, FIG. 6 illustrates the digital syntopical reading system 106 extracting viewpoints for claims using a claim relation graph with an edge weighted graph neural network. In particular, FIG. 6 illustrates the digital syntopical reading system 106 providing a claim relation graph that indicates relationships between claims (e.g., via vector similarity distances) to an edge weighted graph neural network, an aspect detection model, and a topic detection model to extract stances, aspects, and/or topics for viewpoints for the claims.

As shown in FIG. 6, the digital syntopical reading system 106 identifies a claim relation graph 602 (generated in accordance with one or more embodiments herein). Furthermore, as shown in FIG. 6, the digital syntopical reading system 106 utilizes the claim relation graph 602 with the edge weighted graph neural network 604 to determine stance labels for claims (e.g., by evaluating relationships between the claims in the claim relation graph 602). As further illustrated in FIG. 6, the digital syntopical reading system 106 extracts viewpoints 610 from the claim relation graph 602 through the edge weighted graph neural network 604, an aspect detection model 606, and a topic detection model 608.

Indeed, as shown in FIG. 6, the digital syntopical reading system 106 utilizes the edge weighted graph neural network 604 to extract stance labels for the viewpoints 610 for various claims from various digital content items. In addition, as shown in FIG. 6, the digital syntopical reading system 106 utilizes the aspect detection model 606 to determine aspect information for claims in the claim relation graph 602. Moreover, as shown in FIG. 6, the digital syntopical reading system 106 utilizes the topic detection model 608 to determine topic information for claims in the claim relation graph 602. Indeed, the digital syntopical reading system 106 utilizes the determine stance information, aspect information, and topic information to create a viewpoint for a claim.

As an example, as shown in FIG. 6, the digital syntopical reading system 106 extracts a viewpoint 612 which indicates a topic (e.g., "Nuclear Energy"), an aspect (e.g., $A_1$), a stance for the viewpoint (e.g., a positive stance) based on a subset of claims from the claim relation graph (e.g., claims $C_3$ and $C_4$). In addition, as shown in FIG. 6, the digital syntopical reading system 106 also extracts a viewpoint 614 which indicates a topic (e.g., "Nuclear Energy") with a negative stance for the same aspect as in the viewpoint 612 (e.g., $A_1$) derived from another subset of claims from the claim relation graph (e.g., claim $C_1$).

In one or more embodiments, the digital syntopical reading system 106 utilizes an edge weighted graph neural network that include attention transformers (e.g., an EGAT). In particular, in one or more implementations, the digital syntopical reading system 106 utilizes attention transformers from edge weighted graph neural networks to evaluate claim node edge features (while attending to claim node neighbors) from a claim relation graph. Indeed, in one or more instances, the digital syntopical reading system 106 utilizes an edge weighted graph neural network with attention transformers to extract viewpoints from a claim relation graph.

To illustrate, in some implementations, the digital syntopical reading system 106 utilizes graph attention transformers (GATs), as part of an edge weighted graph neural network, to learn an attention distribution over a claim node's neighboring claim nodes in a claim relation graph. For example, while computing a new representation for a claim node i, the digital syntopical reading system 106 utilizes GATs from an edge weighted graph neural network to learn which claim node neighbors to attend to more or less. Indeed, in one or more embodiments, to compute the attention weight for an edge between a claim node i and a claim node j, a GAT layer computes an unnormalized edge weight ($e_{ij}$) using a learned weight matrix W, a learned attention vector a, and the representations for claim nodes i and j as $h_i$ and $h_j$ in accordance with the following function:

$$e_{ij} = e(h_i, h_j) = \text{Leaky Re}\,LU(a^T \cdot [Wh_i \parallel Wh_j]) \quad (2)$$

Furthermore, in reference to the function (2), in some cases, the digital syntopical reading system 106 utilizes (as the LeakyReLU) a leaky rectified linear unit activation.

Subsequently, in one or more embodiments, the digital syntopical reading system 106 determines an attention weight from the edge weight between the claim nodes. For example, the digital syntopical reading system 106 determines an attention weight $\alpha_{ij}$ between claim nodes i and j as a softmax over edge scores of claim node i's k neighboring claim nodes $\mathcal{N}_i$ in accordance with the following function:

$$\alpha_{ij} = \text{softmax}(e_{ij}) = \frac{\exp(\text{Leaky Re}\,LU(a^T \cdot [Wh_i \parallel Wh_j]))}{\sum_{k \in N_i} \exp(\text{Leaky Re}\,LU(a^T \cdot [Wh_i \parallel Wh_k]))} \quad (3)$$

Furthermore, in one or more embodiments, the digital syntopical reading system 106 utilizes the attention weight $\alpha_{ij}$ to compute a new representation $$(h_i^L)$$

for claim node i at layer L as an attentive combination of all of the claim node i's neighbors' previous layer representations in accordance with the following function:

$$h_i^L = \sigma\left(\sum_{j \in N_i} \alpha_{ij}^k W^k h_j^{L-1}\right) \quad (4)$$

In some cases, the digital syntopical reading system 106 replaces a (potentially weighted) adjacency matrix (from a relational graph convolutional neural network) with the learned attention weight from function (4) above.

Additionally, in certain embodiments, the digital syntopical reading system 106 also utilizes GATs with multi-head attention. For instance, the digital syntopical reading system 106 utilizes GATs to learn K independent attention heads for the edge weighted graph neural network. To illustrate, in one or more embodiments, the digital syntopical reading system 106 utilizes GATs to determine a weight matrix, $W^k$, and an attention vector, $a^k$, for each attention head $k \in K$ (to determine a representation $h_i$ for claim node i) in accordance with the following function:

$$h_i = \|_{k=1}^{K} \sigma\left(\sum_{j \in N_i} \alpha_{ij}^k W^k h_j\right) \quad (5)$$

In the above-mentioned function (5), the digital syntopical reading system 106 utilizes an operator $$\|_{k=1}^{K}$$

that represents concatenations over the attention heads K.

Furthermore, in some cases, the digital syntopical reading system 106 utilizes dynamic attention as part of a GAT layer in an edge weighted graph neural network. For instance, in some instances, the digital syntopical reading system 106 utilizes a static attention GAT layer that utilizes a sorted order of neighboring claim node attention weights that are unchanging across all source claim nodes. In one or more implementations, the digital syntopical reading system 106 utilizes a GAT layer with a dynamic attention function that determines a representation for claim nodes i and j as $h_i$ and $h_j$ in accordance with the following function:

$$e(h_i, h_j) = a^T \text{Leaky Re } LU(W \cdot [h_i \| h_j]) \quad (6)$$

Additionally, in one or more implementations, the digital syntopical reading system 106 further utilizes edge weighted graph attention transformer layers (EGAT layers). In particular, in one or more embodiments, the digital syntopical reading system 106 utilize claim relation graphs with the EGAT layers to create sparse vectors of edge weights that combine one or more possible relationships between edge weights. For instance, the digital syntopical reading system 106 utilize a vector of one or more weights on each edge of claim nodes, $f_{ij}$, to compute an edge weight $e(h_i, h_j, f_{ij})$ in accordance with the following function:

$$e(h_i, h_j, f_{ij}) = \text{Leaky Re } LU(a^T \cdot W \cdot [h_i \| f_{ij} \| h_j]) \quad (7)$$

Furthermore, in one or more embodiments, the digital syntopical reading system 106 further utilizes EGAT layer with vector-based edges to GAT dynamic attention layers (e.g., as describe in function (6)) to generate a dynamic attention weight over the edge features and input representations to determine representation for claim nodes i and j as $h_i$ and $h_j$ in accordance with the following function:

$$e(h_i, h_j, f_{ij}) = a^T \text{Leaky Re } LU(W \cdot [h_i \| f_{ij} \| h_j]) \quad (8)$$

In some cases, the digital syntopical reading system 106 utilizes a claim relation graph having multiple edge relationships between claim nodes with the EGAT layer described above (e.g., in functions (7) and (8)) by combining the multiple edge relationships into a dense vector on each edge. In some cases, the digital syntopical reading system 106 determines a superset of each edge between pairs of claim nodes in the claim relation graph and utilizes the superset as an adjacency matrix with each edge in the superset-based claim relation graph as a sparse vector.

Indeed, in one or more instances, the digital syntopical reading system 106 collapses a claim relation graph into a directed graph with vector-features on the edges of the claim relation graph.

Additionally, in one or more embodiments, the digital syntopical reading system 106 utilizes layer normalization with an edge weighted graph neural network to improve training time and generalization. For example, the digital syntopical reading system 106 tracks the mean and variance input instances at training time and utilizes these parameters to normalize both the training and testing inputs of EGAT layers in the edge weighted graph neural network. In some instances, the digital syntopical reading system 106 improves the magnitude of validation loss and the ultimate score on the validation sets by using layer normalization between EGAT layers.

Furthermore, in one or more implementations, the digital syntopical reading system 106 concatenates attention heads within the GAT and/or EGAT operations (e.g., the functions (1)-(8)). In particular, in some embodiments, the digital syntopical reading system 106 improves the speed of training the edge weighted graph neural network (having fewer parameters) by projecting an output of each attention head into a single smaller vector. As an example, the digital syntopical reading system 106 utilizes a projection layer (e.g., after function 5) to consolidate the vectors from multiple attention heads into a single vector. In some instances, the digital syntopical reading system 106 also concatenates the edge attention heads of an EGAT layer (as described above).

Moreover, in one or more embodiments, the digital syntopical reading system 106 also normalizes output attention scores of the attention transformers described above (e.g., to smoothen an attention distribution). For instance, the digital syntopical reading system 106 utilizes a smoothening function, such as, but not limited to square root functions and/or moving average functions to normalize the attention scores of attention transformers. For instance, the digital syntopical reading system 106 computes final attention weights for an attention transformer of an edge weighted graph neural network (e.g., from attention weights of function (3)) in accordance with the following function:

$$\alpha_{ij} = \frac{1}{\sqrt{d}} \alpha_{ij} \quad (9)$$

In some instances, the digital syntopical reading system 106 adds a final classification layer after (stacked) graph neural network layers. For instance, in some cases, the digital syntopical reading system 106 adds one or more linear layers for classification after the (stacked) graph neural network layers. In some embodiments, the digital syntopical reading system 106 adds the one or more final linear layers for classification to improve accuracy of output the classification logits (e.g., stance label classifications).

In some cases, the digital syntopical reading system 106 utilizes an edge weighted graph neural network with attention transformers based on transformer models described in Barrow. In some cases, the digital syntopical reading system 106 trains (or fine tunes) the edge weighted graph neural network models (e.g., based on different sized BERT or RoBERTa models) with fine tuning using a natural language inference (NLI) dataset (e.g., a multi-genre NLI dataset (MNLI)). For example, the digital syntopical reading system 106 concatenates sentence-pairs together with a separator token (e.g., <s> first sentence </s> second sentence </s>). Moreover, in some cases, the digital syntopical reading system 106 learns relationships between the sentence pairs (e.g., fusing information of the sentences for comparison). In some embodiments, the digital syntopical reading system 106 encodes topic-sentence pairs (e.g., <s> topic </s> sentence </s>). Then, the digital syntopical reading system 106 utilizes the NLI fine tuning for relevant claim identification from claims in content items.

Indeed, experimenters utilized an implementation of the digital syntopical reading system with MNLI fine-tuning to observe improvements in claim extraction tasks. For instance, utilizing MNLI fine-tuning with a RoBERTa Large model resulted in improvements for P scores, R scores, and $F_1$ scores for both 2-label and 3-label claim extraction tasks. Furthermore, as discussed below, various node encoding models implemented with MNLI fine tuning also improved stance detection with utilization of claim relation graphs and graph neural networks in accordance with one or more implementations of the digital syntopical reading system.

In one or more instances, the digital syntopical reading system 106 utilizes the determined representation from an edge weighted graph neural network (as described above) for a claim node to determine a stance label for the claim node. In particular, in some embodiments, the digital syntopical reading system 106 utilizes the edge weighted graph neural network (e.g., a classification layer of the edge weighted graph neural network) to output a stance label for a claim from the representation of the claim node determined by the edge weighted graph neural network. Indeed, in some cases, the digital syntopical reading system 106 utilizes the edge weighted graph neural network to determine a stance label for a claim in relation to an aspect of the claim. For example, the digital syntopical reading system 106 utilizes the edge weighted graph neural network to determine a stance label that indicates a claim as having a positive stance (e.g., supporting the determined aspect of the claim), a negative stance (e.g., rebutting or not supporting the determined aspect of the claim), and/or a neutral stance (e.g., neither supporting nor rebutting the determined aspect of the claim). In some cases, the digital syntopical reading system 106 utilizes a claim relation graph (generated in accordance with one or more embodiments herein) to determine (or obtains) a stance label for a claim using stance detection (e.g., via a relational graph convolution network (R-GCN)) as described in Barrow.

Additionally, as shown in FIG. 6, the digital syntopical reading system 106 utilizes the aspect detection model 606 to determine an aspect for a claim from the claim relation graph 602. In some instances, the digital syntopical reading system 106 utilizes aspect clustering with the claims in the claim relation graph to cluster claims having similar clusters into individual clusters. In one or more implementations, the digital syntopical reading system 106 utilizes an unsupervised learning task for modularity-based community detection to determine aspects for claims in the claim relation graph 602. Indeed, in one or more embodiments, the digital syntopical reading system 106 detects aspects for claims (from a claim relation graph) as described in Barrow. In some cases, the digital syntopical reading system 106 utilizes modularity-based community detection.

In one or more embodiments, the digital syntopical reading system 106 the digital syntopical reading system 106 determines a topic for a claim from the claim relation graph (utilizing the topic detection model 608). In some instances, the topic detection model 608 utilizes central claim identification to determine a topic for a claim. In particular, in one or more embodiments, the digital syntopical reading system 106 clusters claims in a claim relation graph and identifies a claim which is most representative of the cluster to determine a topic (e.g., based on the most representative claim). In order to identify a representative claim from the cluster of claims, the digital syntopical reading system 106, in some instances, scores and ranks the claims in the cluster (to rank claims based on similarity to other claims in the cluster, such as cosine similarities). In some cases, the digital syntopical reading system 106 identifies a centroid claim node from the cluster of claim nodes to determine a representative claim for the topic.

In some instances, the digital syntopical reading system 106 utilizes a query (provided from a client device in accordance with one or more embodiments herein) as a topic. For instance, the digital syntopical reading system 106 utilizes the query to identify claim nodes relevant to the query and labels the claims with the query (as the topic). Moreover, in one or more implementations, the digital syntopical reading system 106 determines a topic for a claim as described in Barrow.

In some embodiments, the digital syntopical reading system 106 utilizes a combination of a pretrained language model and (stacked) graph neural network (GNN) layers to train stance detection and/or central claim detection models (e.g., for aspect detection and/or topic detection). Indeed, in some instances, the digital syntopical reading system 106 utilizes both output from GNN layers and transformer language models to generate predictions for claim nodes. In some embodiments, the digital syntopical reading system 106 utilizes the GNN layers and the transformer language models to generate a prediction for each claim node that is a linear combination of a linear layer on top of the (stacked) GNN layers and a linear layer on top of a fine-tuned language model in accordance with the following function:

$$P(C = c \mid X = x) = \tag{10}$$
$$\lambda P_{transformer}(C = c \mid X = x) + (1 - \lambda) P_{gnn}(C = c \mid X = x)$$

In the above-mentioned function (10), in some cases, the digital syntopical reading system 106 utilizes $\lambda$ as an interpolation weight chosen as a hyperparameter. Indeed, in some cases, the digital syntopical reading system 106 utilizes a transformer encoder as both input to the graph and a prediction output (e.g., similar to skip connections to smoothly propagate through deep networks).

In one or more embodiments, the digital syntopical reading system 106 trains an edge weighted graph neural network (e.g., an EGAT and/or GNN) to classify stance labels from a claim relation graph. In particular, in one or more embodiments, the digital syntopical reading system 106 utilizes a training set of claims (or sentences) labeled with stances. Moreover, in some cases, the digital syntopical reading system 106 utilizes the claim relation graph construction (in accordance with one or more embodiments herein) and an edge weighted graph neural network with attention transformers (as described herein) to classify the training set of claims with predicted stances. Moreover, in one or more embodiments, the digital syntopical reading system 106 compares the predicted stances to the ground truth stance labels from the training data set to backpropagate a loss to the edge weighted graph neural network (e.g., to learn or adjust parameters of the edge weighted graph neural network to minimize or reduce the loss). In some instances, the digital syntopical reading system 106 trains the edge weighted graph neural network as described in Barrow.

Figure 7:
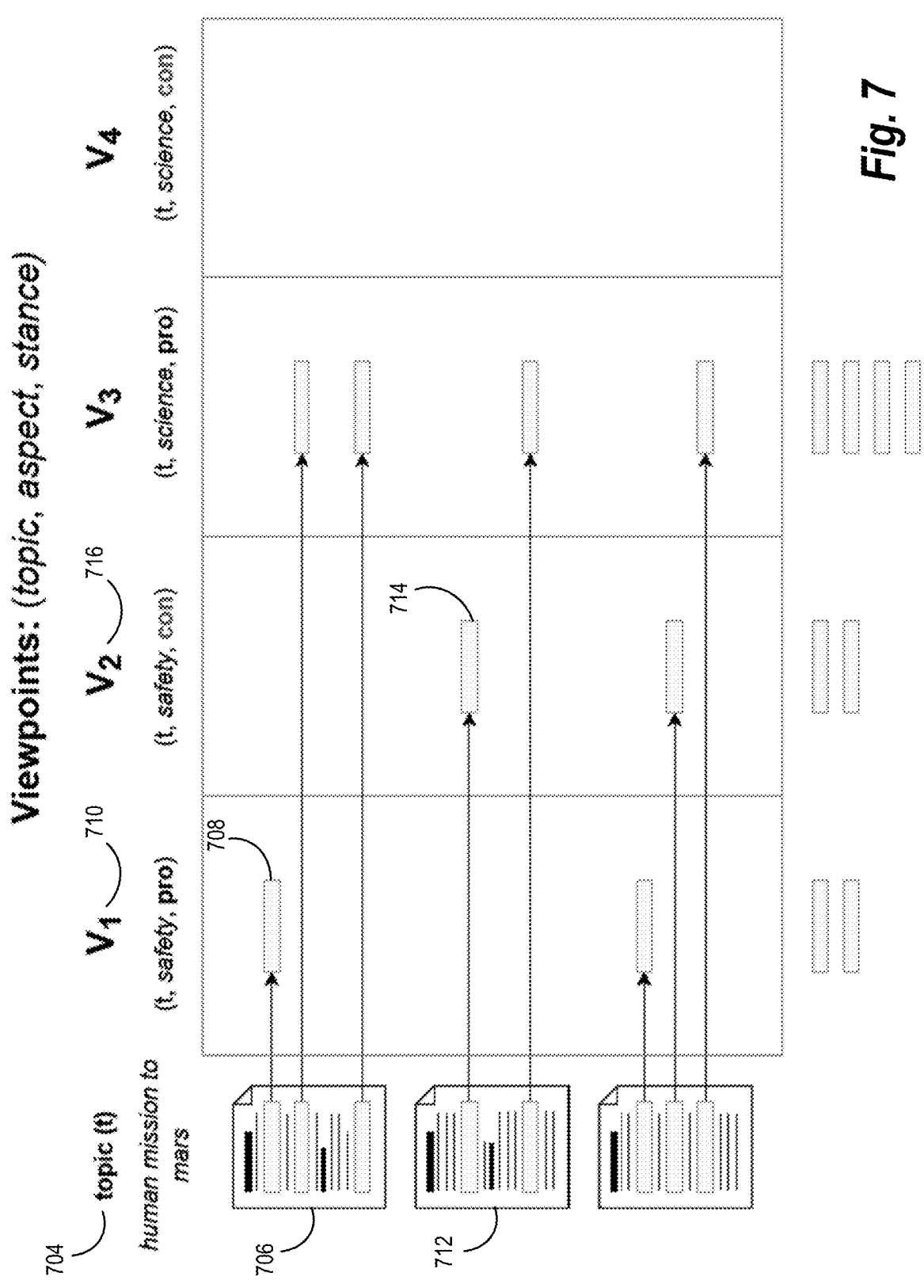
FIG. 7 illustrates a digital syntopical reading system generating viewpoints for digital content items in accordance with one or more implementations.

As mentioned above, in one or more embodiments, the digital syntopical reading system 106 utilizes detected topics, aspects, and stances for claims from content items to generate viewpoints for the content items. For example, FIG. 7 illustrates the digital syntopical reading system 106 utilizing stance label data, aspect data, and topic data for claims (determined in accordance with one or more embodiments herein) to generate viewpoints for digital content items. In particular, FIG. 7 illustrates the digital syntopical reading system 106 utilize topic, stance, and aspect data to generate viewpoints for various claims from various digital content items.

As shown in FIG. 7, the digital syntopical reading system 106 identifies a topic 704 (e.g., from a query, from claim clustering). Furthermore, the digital syntopical reading system 106 utilizes a stance and an aspect determined for a claim 708 from digital content item 706 to generate a viewpoint 710 (e.g., with a topic of "human mission to mars," an aspect of "safety," and a positive stance for the aspect) for the claim 708 from the digital content item 706. Likewise, the digital syntopical reading system 106 utilizes an aspect and stance determined for a claim 714 from the digital content item 712 to generate a viewpoint 716 (e.g., with a topic of "human mission to mars," an aspect of "safety," and a negative stance for the aspect).

In one or more embodiments, the digital syntopical reading system 106 determines a viewpoint for a claim (of a digital content item) that represents an expression of an aspect of a topic that conveys a stance towards the topic (e.g., V=(topic, aspect, stance). In some cases, as shown in FIG. 7, the digital syntopical reading system 106 can identify a viewpoint that is demonstrated in multiple claims from multiple digital content items (e.g., viewpoint V3 in FIG. 7). As an example, for the following two claims, "a manned flight to Mars currently seems to be high-risk adventure" and "highly energetic, heavy-charged particles from galactic cosmic radiation cannot be sufficiently shielded in space vehicles," the digital syntopical reading system 106 determines a viewpoint expressed by the following:

$$V=(\text{Human Spaceflight to Mars, human presence, CON}).$$

In some instances, the digital syntopical reading system 106 associates the viewpoints to the digital content item. For example, upon determining a viewpoint for a claim, the digital syntopical reading system 106 identifies the digital content item that corresponds to the claim. Subsequently, the digital syntopical reading system 106 maps the viewpoint for the claim to the digital content item.

Figure 8:
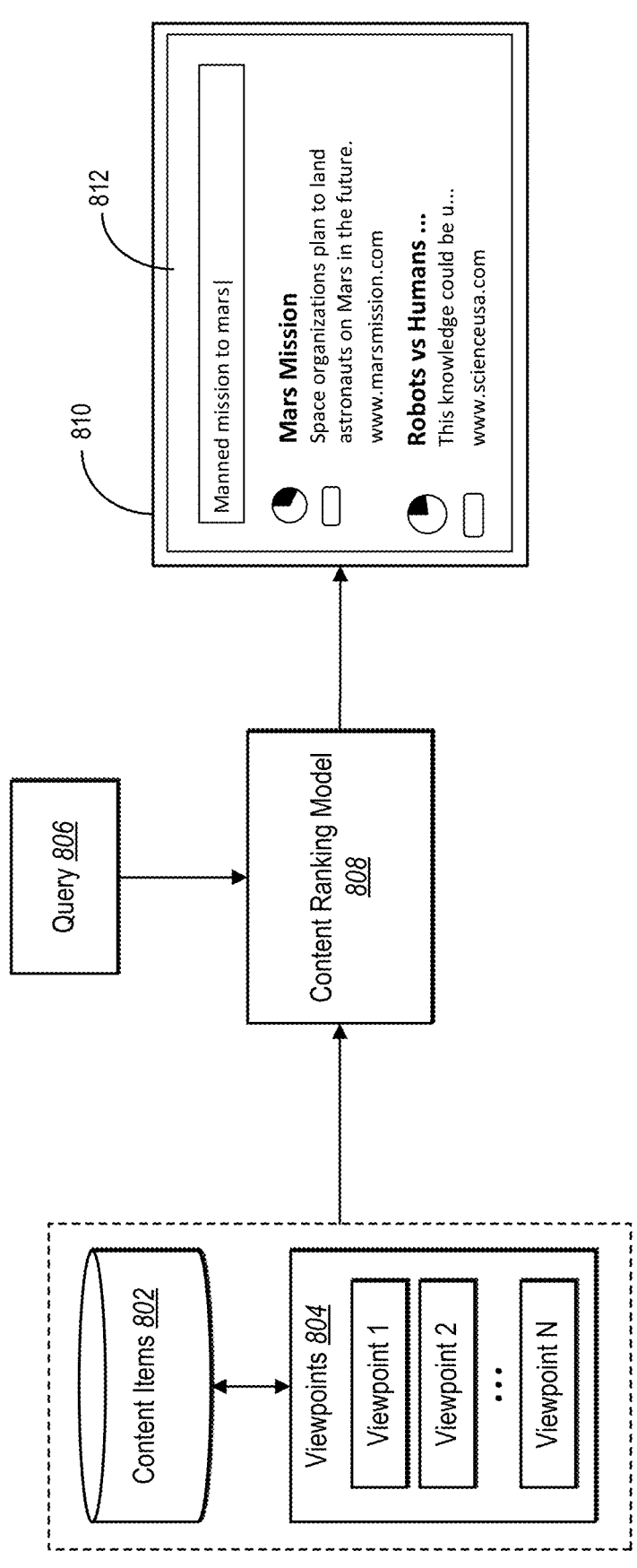
FIG. 8 illustrates a digital syntopical reading system utilizing extracted viewpoints for content retrieval in response to a query in accordance with one or more implementations.

Furthermore, as mentioned above, the digital syntopical reading system 106 utilizes extracted viewpoints in various content retrieval applications. For example, FIG. 8 illustrates the digital syntopical reading system 106 utilizing extracted viewpoints for content retrieval in response to a query. In particular, FIG. 8 illustrates the digital syntopical reading system 106 utilize a content ranking model with a query and extracted viewpoints from content items to retrieve diverse and balanced content items for the query (e.g., as a syntopical search result).

For instance, as shown in FIG. 8, the digital syntopical reading system 106 receives a query 806 (from a client device 810). In response to the query 806, the digital syntopical reading system 106 accesses content items 802 and viewpoints 804 associated with the content items 802 to rank content items using a content ranking model 808. Indeed, in one or more embodiments, the digital syntopical reading system 106 ranks content items by relevancy to the query 806 and based on the viewpoints associated with content items. Moreover, as shown in FIG. 8, the digital syntopical reading system 106 utilizes the content ranking to provide, for display within a graphical user interface 812 of the client device 810, a representation of the content items and viewpoint information from viewpoints of the content items.

In one or more embodiments, the digital syntopical reading system 106 utilizes viewpoints computed across a set of relevant pages to retrieve a diverse and balanced set of viewpoints for a search query. In some instances, the digital syntopical reading system 106 utilizes viewpoints as cross-content item links for a list of content items that are relevant to a query. In particular, FIG. 9 illustrates the digital syntopical reading system 106 utilizing viewpoints to rank content in a content ranking model.

Figure 9:
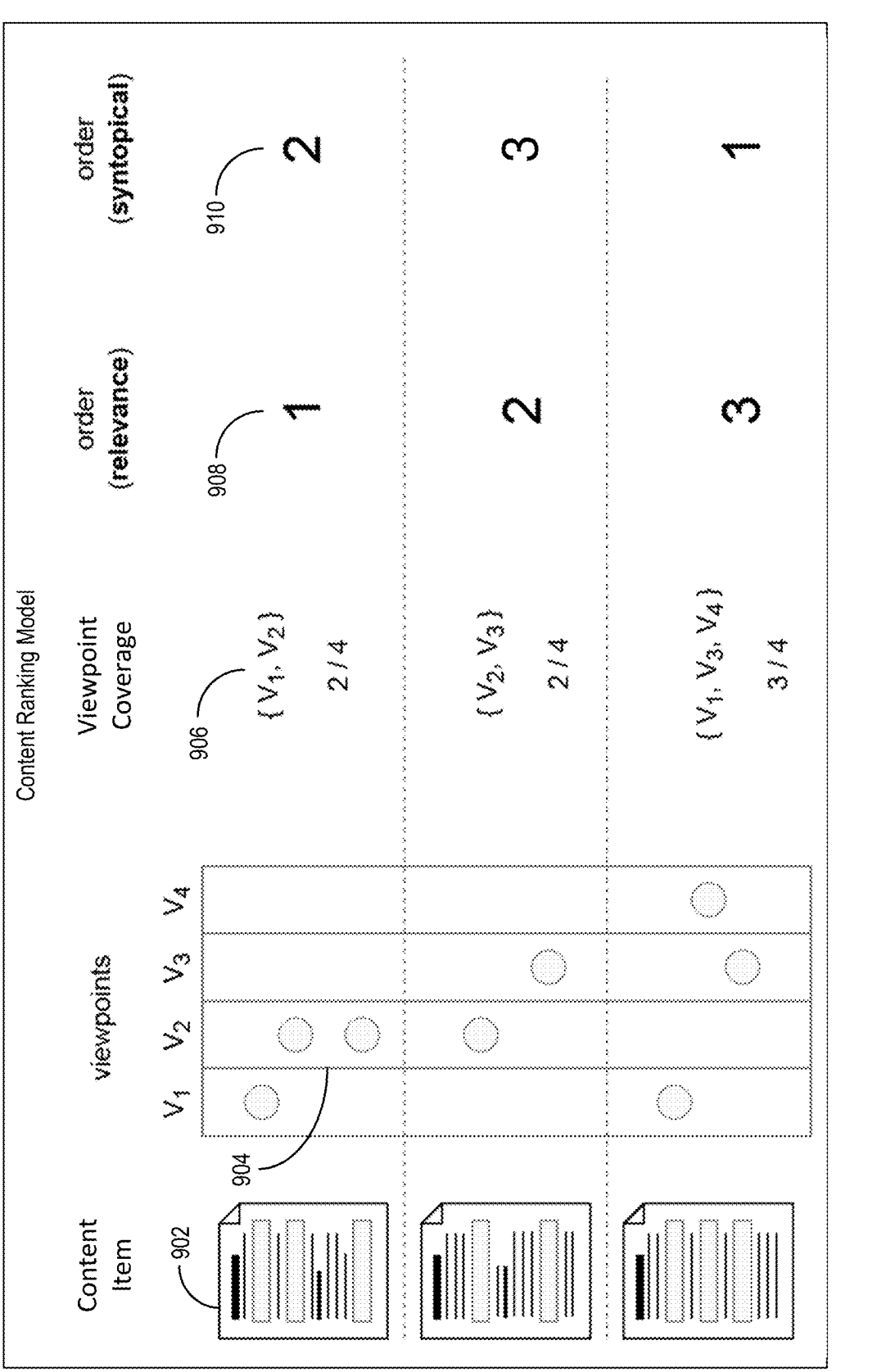
FIG. 9 illustrates a digital syntopical reading system utilizing viewpoints to rank content in a content ranking model in accordance with one or more implementations.

For example, as shown in FIG. 9, the digital syntopical reading system 106 retrieves content items using a relevancy-based retrieval system (e.g., ordered based on relevancy of content items to a query). In some instances, the digital syntopical reading system 106 retrieves a set of k content items relevant to a search query. Then, in one or more embodiments, the digital syntopical reading system 106 reranks the set of k content items based on viewpoints associated with the content items.

For example, as showed in FIG. 9, the digital syntopical reading system 106 utilizes a viewpoint coverage 906 corresponding to a content item 902 and viewpoints 904 of the content item 902 to rerank a relevance order 908 of the content item 902 to obtain a syntopical order 910 of the content item 902. For instance, in some cases, the digital syntopical reading system 106 utilizes, as the viewpoint coverage 906, a number of different viewpoints corresponding to the content item 902. Indeed, as shown in FIG. 9, the digital syntopical reading system 106 reranks the content items such that the content item with the highest viewpoint coverage is ranked the highest.

In one or more embodiments, the digital syntopical reading system 106 determines a viewpoint coverage that indicates a percentage of digital content items that have a claim that expresses a certain viewpoint. For instance, the digital syntopical reading system 106 can provide a higher rank to a first content item that includes a higher percentage of viewpoints that exist amongst a set of content items retrieved for a search query compared to a second content item that includes a relatively lower percentage of viewpoints. In one or more embodiments, the digital syntopical reading system 106 determines a number of unique viewpoints expressed in claims in a digital content item as the viewpoint coverage (e.g., a viewpoint coverage that increases based on an increase in number of unique viewpoints in a digital content item).

Additionally, in some implementations, the digital syntopical reading system 106 utilizes an approximate set cover algorithm with viewpoints to rerank a set of retrieved content items. For example, the digital syntopical reading system 106 utilizes an approximate set cover algorithm to maximize a number of viewpoints covered by a minimal number of digital content items. For instance, the digital syntopical reading system 106 identifies a minimum number of digital content items to surface to encounter each of the viewpoints in a collection of viewpoints. In particular, the digital syntopical reading system 106 utilizes an approximate set cover algorithm with a goal to select a minimal subset of content items that cover a set of viewpoints. For instance, the digital syntopical reading system 106 utilizes greedy approximation to select a set that provides the largest gain in viewpoints. In some cases, the digital syntopical reading system 106 utilizes a union of reconstructed viewpoints and identifies a subset of content items that, with the minimal number of content items, covers the union of reconstructed viewpoints.

Furthermore, in one or more embodiments, the digital syntopical reading system 106 utilizes a weighted set cover algorithm with viewpoints to rerank a set of retrieved content items. In particular, in one or more embodiments, the digital syntopical reading system 106 assigns a weight, or a cost, to a subset of content items to find a minimal subset of content items with a minimal cost. For instance, the digital syntopical reading system 106 applies an L2 penalty based on a length of a digital content item (e.g., to reduce a bias towards sampling a longest content item). For example, the digital syntopical reading system 106 determines a cost C for a number of sentences within a digital content item (as a length len) for a digital content set d (for a full set of viewpoints) in accordance with the following function:

$$C(d) = (len(d))^2 \qquad (11)$$

Additionally, in the weighted set cover algorithm, the digital syntopical reading system 106, in some instances, utilizes a priority queue to greedily find a next most cost-effective set of digital content items that cover a set of viewpoints. For instance, in some cases, the digital syntopical reading system 106 utilizes a heuristic for cost-effectiveness based on a weight C and a number of uncovered items (using a set of content items for currently-covered viewpoints c) in accordance with the following function:

$$\operatorname*{argmin}_{d} \frac{c(d)}{d - c} \qquad (12)$$

Indeed, although the digital syntopical reading system 106 illustrates specific approaches to rank content items based on viewpoints corresponding to digital content items, the digital syntopical reading system 106, in one or more instances, utilizes various other approaches to rank digital content item utilizing viewpoints or statistics corresponding to viewpoints determined for digital content items.

Figure 10:
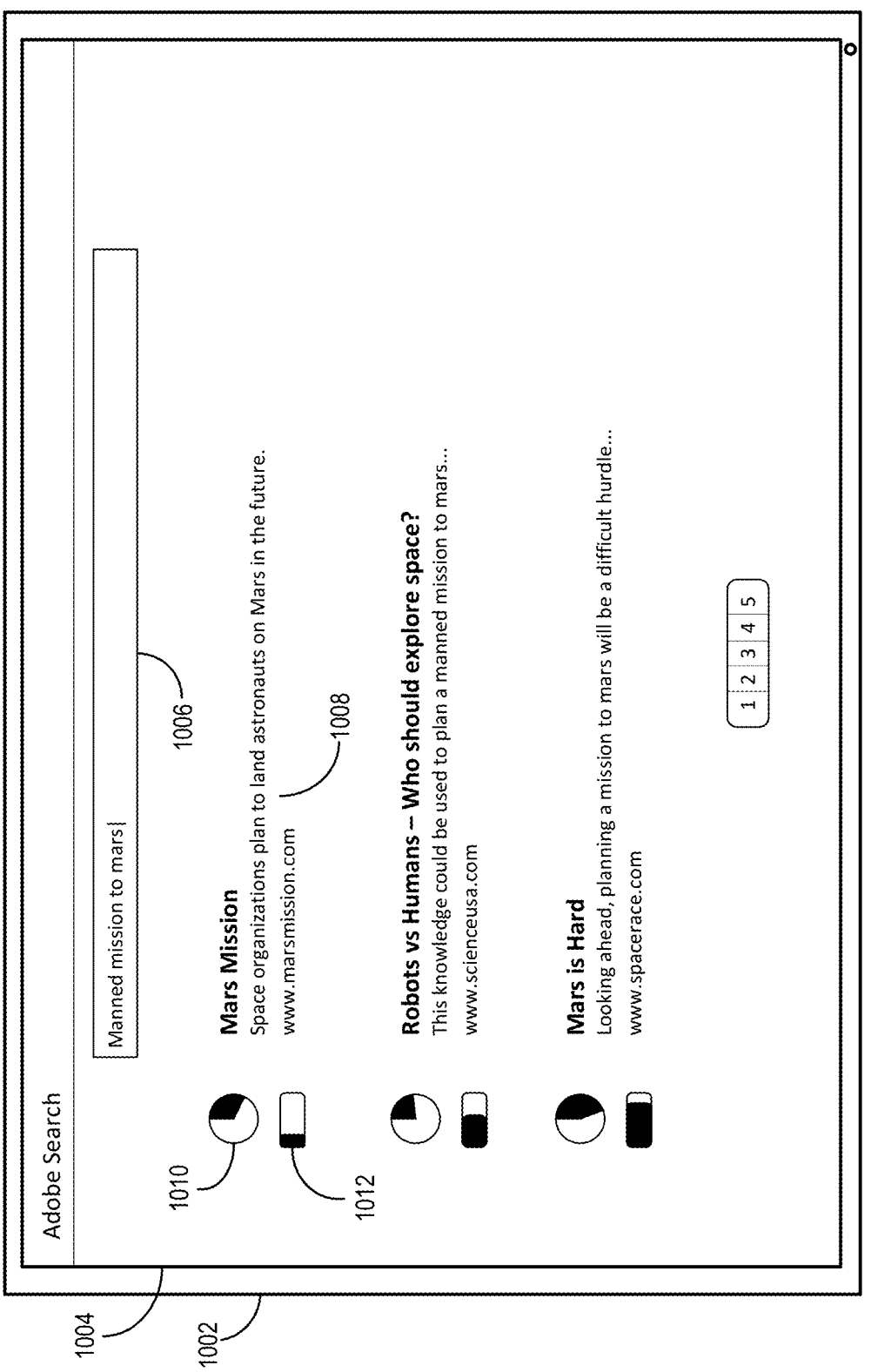
FIG. 10 illustrates a digital syntopical reading system displaying content item representations and viewpoint information for digital content items in accordance with one or more implementations.

In one or more embodiments, the digital syntopical reading system 106 provides, for display within a graphical user interface, a representation of a content item and viewpoint information from viewpoint(s) of the content item. For example, FIG. 10 illustrates the digital syntopical reading system 106 displaying content item representations and viewpoint information for digital content items. In particular, FIG. 10 illustrates the digital syntopical reading system 106 retrieving content items for a search query based on viewpoints and displaying content item representations and viewpoint information for the viewpoints.

As shown in FIG. 10, the digital syntopical reading system 106 receives a query 1006 from a client device 1002 within a graphical user interface 1004. In response to the query 1006, the digital syntopical reading system 106 retrieves digital content items and displays a content item representation 1008 (e.g., a link to a content item, a download option for a content item, a description of a content item) based on viewpoints (as described above). In addition, the digital syntopical reading system 106 utilizes viewpoints associated with the content item representation 1008 to display viewpoint information (e.g., a graphical user element 1010 indicating a stance distribution and a graphical user element 1012 indicating a viewpoint coverage).

In some cases, the graphical user element 1010 indicates a stance distribution from viewpoints associated with a digital content item corresponding to the digital content item representation 1008. Indeed, in some implementations, the digital syntopical reading system 106 computes a ratio of pro and con (e.g., positive and negative) stances for claims within a digital content item from viewpoints extracted for the digital content item. Then, the digital syntopical reading system 106 provides, for display within the graphical user element 1010, an illustration of the ratio between the stances (e.g., a percentage of positive stances versus negative stances) from claims of a digital content item. In some embodiments, the digital syntopical reading system 106 further provides, for display within the graphical user element 1010, an illustration of a ratio for neutral stance determinations in a digital content item (in addition to positive and/or negative stance determinations). Furthermore, although one or more embodiments illustrate the digital syntopical reading system 106 displaying a pie chart element as the graphical user element 1010, the digital syntopical reading system 106, in some cases, utilizes a variety of graphical user interfaces, such as, but not limited to, bar graphs, numerical depictions, bars, and/or changing shape sizes for the graphical user element 1010.

In one or more implementations, the graphical user element 1012 indicates a viewpoint coverage associated with a digital content item corresponding to the digital content item representation 1008. Indeed, in some embodiments, the digital syntopical reading system 106 determines a viewpoint coverage for a digital content item as described above. Then, the digital syntopical reading system 106 can portray (or depict) the viewpoint coverage (e.g., a numerical amount) within the graphical user element 1012. For example, the digital syntopical reading system 106 utilizes a fillable bar as the graphical user element 1012 to illustrate an amount of viewpoint coverage within the digital content item represented by the digital content item representation 1008. Furthermore, although one or more embodiments illustrate the digital syntopical reading system 106 displaying a fillable bar element as the graphical user element 1012, the digital syntopical reading system 106, in some cases, utilizes a variety of graphical user interfaces, such as, but not limited to, bar graphs, numerical depictions, bars, and/or changing shape sizes for the graphical user element 1012.

Additionally, in some cases, the digital syntopical reading system 106 enables various syntopical reading functions for digital content. For example, the digital syntopical reading system 106 utilizes the claim relation graph and viewpoint extraction (as described above) to generate a syntopically scaffolded collection of content for a collection of content items. Indeed, in one or more instances, the digital syntopical reading system 106 utilizes the claim relation graph and viewpoint extraction (as described above) to identify relevant passages from content items in response to a topic of interest (or query), identifying common terms utilized in relevant passages, presenting topic break downs into sub-topics (e.g., aspects), utilizing stance labels from viewpoints to define issues described in content items, and/or analyzing and generating a computer-based understanding of a digital content item for a user.

Figure 11:
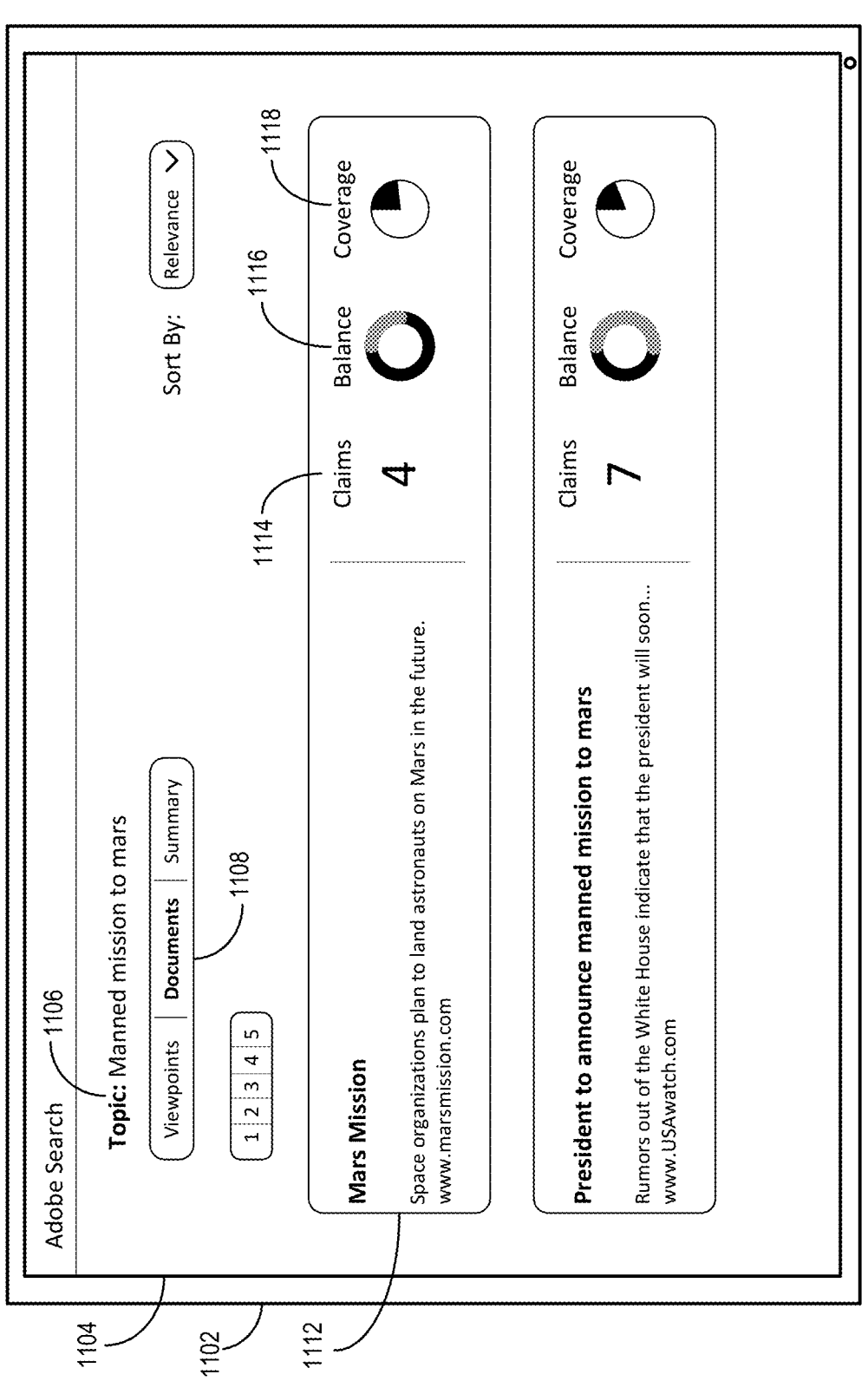
FIG. 11 illustrates a digital syntopical reading system displaying digital content items with viewpoint information in accordance with one or more implementations.

In some cases, the digital syntopical reading system 106 utilizes the claim relation graph and viewpoint extraction (as described above) to generate a syntopically scaffolded collection of digital content items from a collection of content items with viewpoint information. For example, FIG. 11 illustrates the digital syntopical reading system 106 generating, for display within a graphical user interface, a collection of digital content items from a collection of content items with viewpoint information. For instance, as shown in FIG. 11, the digital syntopical reading system 106 displays, within a graphical user interface 1104 of a client device 1102 digital content items with viewpoint information under a digital content item tab 1108.

In particular, in one or more embodiments, the digital syntopical reading system 106 enables a user of the client device 1102 to select a topic 1106. In response to the topic selection, as shown in FIG. 11, the digital syntopical reading system 106 displays digital content items relevant to the topic (from a collection of content items) with viewpoint information. For instance, as shown in FIG. 11, the digital syntopical reading system 106 displays, within the graphical user interface 1104, a representation 1112 of a digital content item and various viewpoint information elements for the digital content item representation 1112. For example, as shown in FIG. 11, the digital syntopical reading system 106 displays, within the graphical user interface 1104, an indicator 1114 for a number of claims identified within the digital content item associated with the digital content item representation 1112. Furthermore, the digital syntopical reading system 106 also display, within the graphical user interface 1104, a first graphical user element 1116 to indicate a stance distribution and a second graphical user element 1118 to indicate a viewpoint coverage for the content item associated with the digital content item representation 1112.

Figure 12:
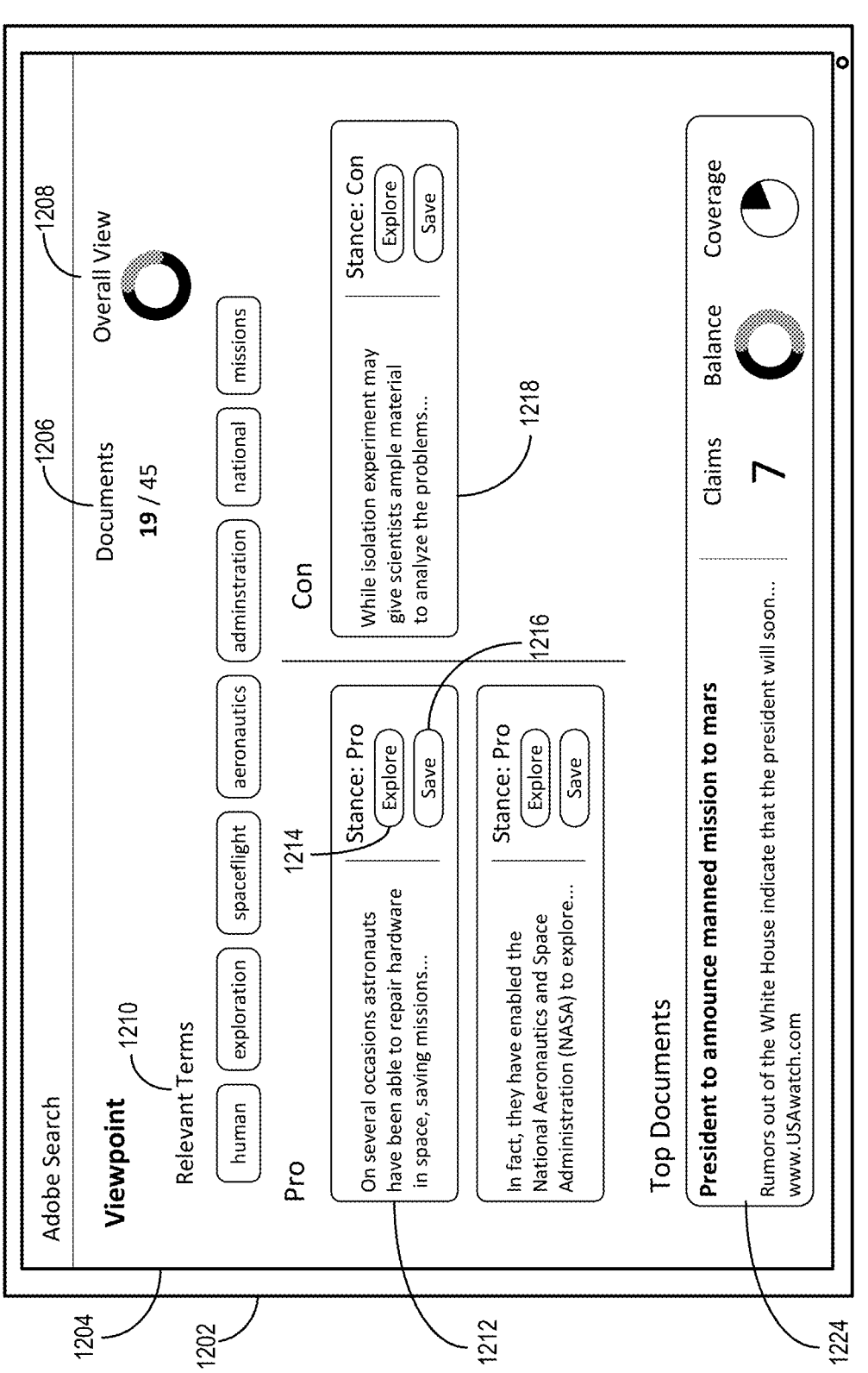
FIGS. 12 and 13 illustrate a digital syntopical reading system displaying viewpoints from a digital content item in accordance with one or more implementations.

In one or more embodiments, the digital syntopical reading system 106 displays a viewpoint analysis page to display viewpoints from a digital content item. For instance, FIG. 12 illustrates the digital syntopical reading system 106 displaying viewpoints from a digital content item. As shown in FIG. 12, the digital syntopical reading system 106 provides, for display within a graphical user interface 1204 of a client device 1202, viewpoint data for a digital content item 1206.

As shown in FIG. 12, the digital syntopical reading system 106 displays a graphical user element 1208 to indicate an overall stance distribution from viewpoints in the digital content item 1206. Additionally, as shown in FIG. 12, the digital syntopical reading system 106 displays a viewpoint 1212 with a positive stance (from the digital content item 1206). In addition, the digital syntopical reading system 106 also displays a selectable option 1214 to request additional information for the viewpoint 1212. Moreover, the digital syntopical reading system 106 also displays a selectable option 1216 to save the viewpoint 1212 (e.g., in association to the digital content item 1206) on a user account. Furthermore, as shown in FIG. 12, the digital syntopical reading system 106 also displays a viewpoint 1218 with a negative stance (from the digital content item 1206).

Furthermore, in some cases, the digital syntopical reading system 106 displays related digital content items to a viewed digital content item. For example, as shown in FIG. 12, the digital syntopical reading system 106 provides, for display within the graphical user interface 1204, a suggested digital content item 1224 relevant to the digital content item 1206 (e.g., based on viewpoints). Indeed, the digital syntopical reading system 106 displays the suggested digital content item 1224 with viewpoint information for the suggested digital content item 1224.

Additionally, as shown in FIG. 12, the digital syntopical reading system 106 displays relevant terms 1210 for viewpoints in the digital content item 1206. In some cases, the digital syntopical reading system 106 determines the viewpoint terms utilizing feature importance approaches. In particular, in some implementations, the digital syntopical reading system 106 extracts terms present in claims associated with the viewpoints. Subsequently, in one or more embodiments, the digital syntopical reading system 106 computes 2×2 tables for each term to represent whether a term is present or not by two classes ("in viewpoint" or "not in viewpoint"). Then, in one or more implementations, the digital syntopical reading system 106 utilizes the tables to compute a $\chi^2$ statistic for each term. For instance, the digital syntopical reading system 106 utilizes a high value of the statistic as an indication of high association with a viewpoint. Indeed, in one or more embodiments, the digital syntopical reading system 106, for each viewpoint, selects a threshold number of terms sorted by the terms' $\chi^2$ statistics.

Figure 13:
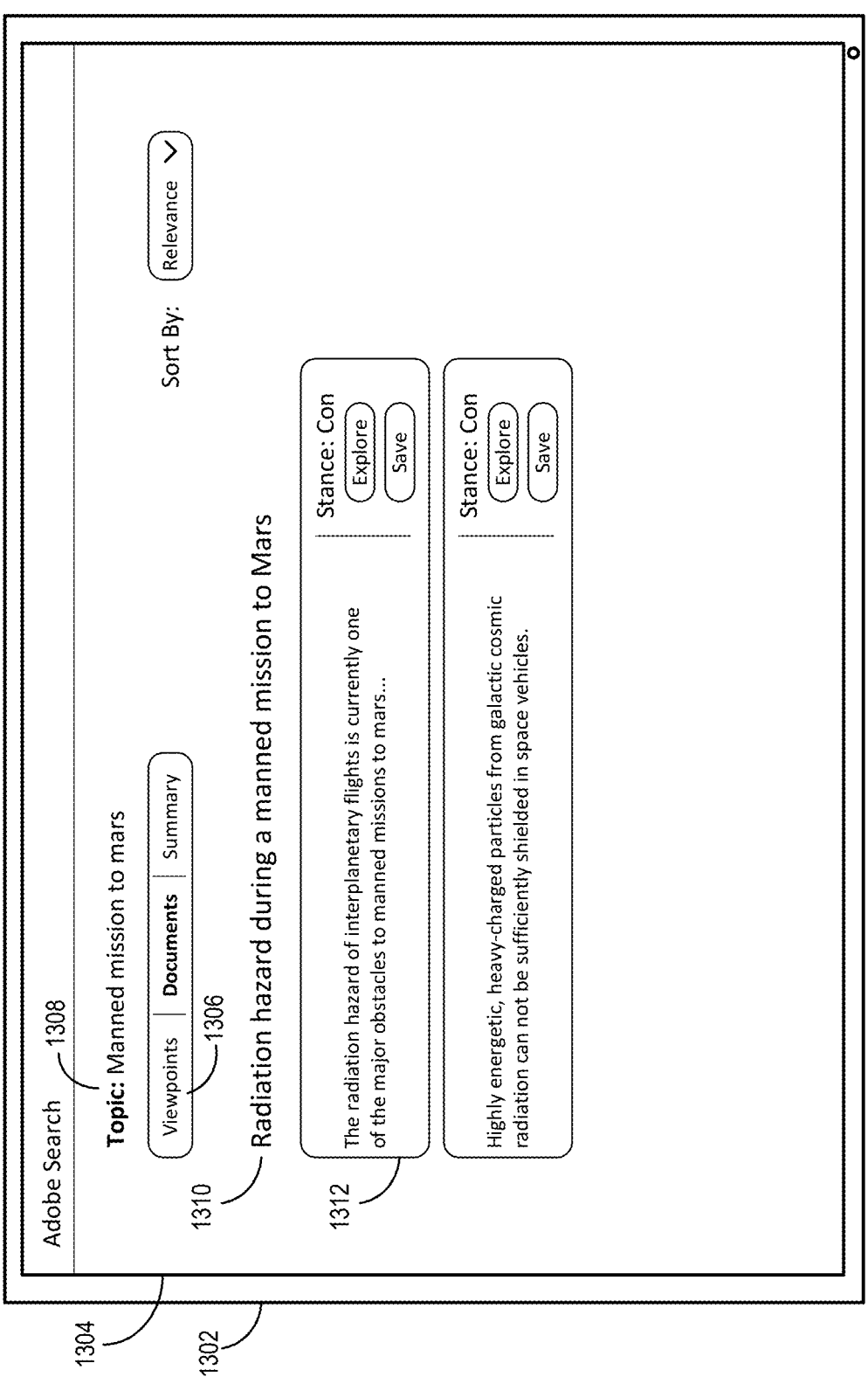

In some cases, the digital syntopical reading system 106 displays viewpoints for various topics and/or aspects. For instance, FIG. 13 illustrates the digital syntopical reading system 106 displaying viewpoints determined from digital content items. In particular, FIG. 13 illustrates the digital syntopical reading system 106 displaying a collection of viewpoints sorted by topics and/or aspects that are determined within a collection of content items.

In particular, as shown in FIG. 13, the digital syntopical reading system 106 provides, for display within a graphical user interface 1304 of client device 1302, viewpoints 1312 determined for a particular topic 1308 from digital content items in a collection of digital content items under a viewpoints tab 1306. For instance, the digital syntopical reading system 106 displays the viewpoints 1312 organized by an aspect 1310. Indeed, in one or more implementations, the digital syntopical reading system 106 displays viewpoints organized by topics and aspects determined from claims in content items in a content item collection. In one or more embodiments, the digital syntopical reading system 106 enables users to browse various topics and aspects identified in a digital content collection to view various viewpoints for the topics and aspects.

In one or more embodiments, the digital syntopical reading system 106 utilizes content retrieval applications (e.g., one or more of the above-mentioned applications) by predetermining viewpoints from a content collection and/or in near-real time with a query. For instance, in some cases, the digital syntopical reading system 106 predetermines viewpoints from a content collection by generating claim relation graphs and extracting viewpoints in accordance with one or more implementations herein. Subsequently, in one or more embodiments, the digital syntopical reading system 106 identifies relevant content items based on predetermined viewpoints and/or identifies predetermined viewpoints based on a query from a client device. In some instances, the digital syntopical reading system 106 digital syntopical reading system 106 determines viewpoints from a content collection by generating claim relation graphs and extracting viewpoints (in accordance with one or more implementations herein) upon receiving a query (e.g., to limit the search space to the query).

Figure 14:
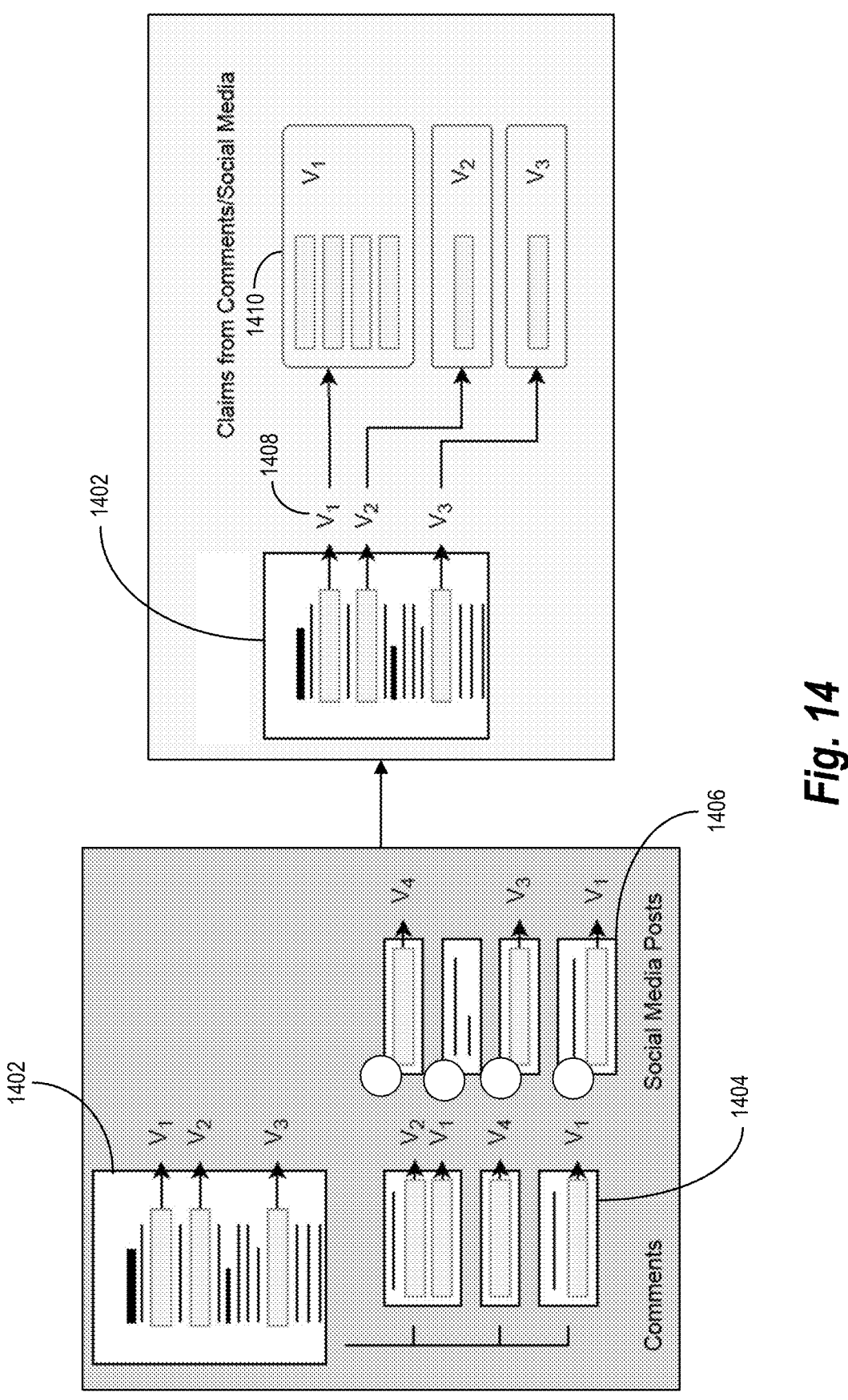
FIG. 14 illustrates a digital syntopical reading system socially contextualizing claims in digital content using viewpoints extracted from social media posts in accordance with one or more implementations.

As also mentioned above, the digital syntopical reading system 106 socially contextualizes claims from digital content to present viewpoints from social media posts in relation to claims in the digital content. For instance, FIG. 14 illustrates the digital syntopical reading system 106 socially contextualizing claims in digital content using viewpoints extracted from social media posts. Indeed, FIG. 14 illustrates the digital syntopical reading system 106 extracting viewpoints from social media posts in relevance to claims within a digital content item to associate the social media posts to the claims.

In particular, as shown in FIG. 14, the digital syntopical reading system 106 identifies a digital content item 1402 (e.g., an electronic document within a document reader interface, a website article, a video transcription). Then, as shown in FIG. 14, the digital syntopical reading system 106 extracts claims 1404 (e.g., comments, sentences) from the digital content item 1402. In some cases, as shown in FIG. 14, the digital syntopical reading system 106 determines viewpoints for the extracted claims 1404 (e.g., V1, V2, V3, V4).

Moreover, as shown in FIG. 14, the digital syntopical reading system 106 identifies social media posts 1406 from a collection of content items. In addition, the digital syntopical reading system 106 embeds the social media posts within a metric space and determines viewpoints (e.g., topic, aspect, stances) for the social media posts in accordance with one or more embodiments herein. In some instances, the digital syntopical reading system 106 utilizes the claims 1404 as queries to identify relevant social media posts from the social media posts 1406 based on viewpoints associated with the social media posts (in accordance with one or more embodiments herein). In particular, the digital syntopical reading system 106 utilizes the claims 1404 as search queries to identify social media posts 1406 (or comments) relevant to the claims 1404 using the determined viewpoints for the social media posts 1406 (and/or the embedded social media posts in a metric space).

Furthermore, as shown in FIG. 14, the digital syntopical reading system 106 associates various social media posts 1410 to claims 1408 from the digital content item 1402. In some cases, the digital syntopical reading system 106 identifies matching aspects (from viewpoints) of the claims 1408 from the digital content item 1402 and aspects (from viewpoints) determined from the social media posts 1410. Furthermore, in some embodiments, the digital syntopical reading system 106 maps the social media posts 1410 to the claims 1408 using the matching aspects. As shown in FIG. 14, the digital syntopical reading system 106 maps viewpoints of claims 1408 to viewpoints of the social media posts 1410. Indeed, in one or more embodiments, the digital syntopical reading system 106 associates the social media posts 1410 to claims 1408 from the digital content item 1402 to link comments and/or other social engagements to content within the digital content.

In one or more embodiments, the digital syntopical reading system 106 further utilizes stance labels from the viewpoints associated with the social media posts to provide a level of support from social media posts (and/or comments) to claims within a digital content item. For instance, the digital syntopical reading system 106 utilizes the stance labels from the viewpoints of the social media posts that are mapped to a claim within a digital content item to indicate a level of support (e.g., in terms of stance distribution) from social media posts and/or other comments for the claim within the digital content item.

Figure 15:
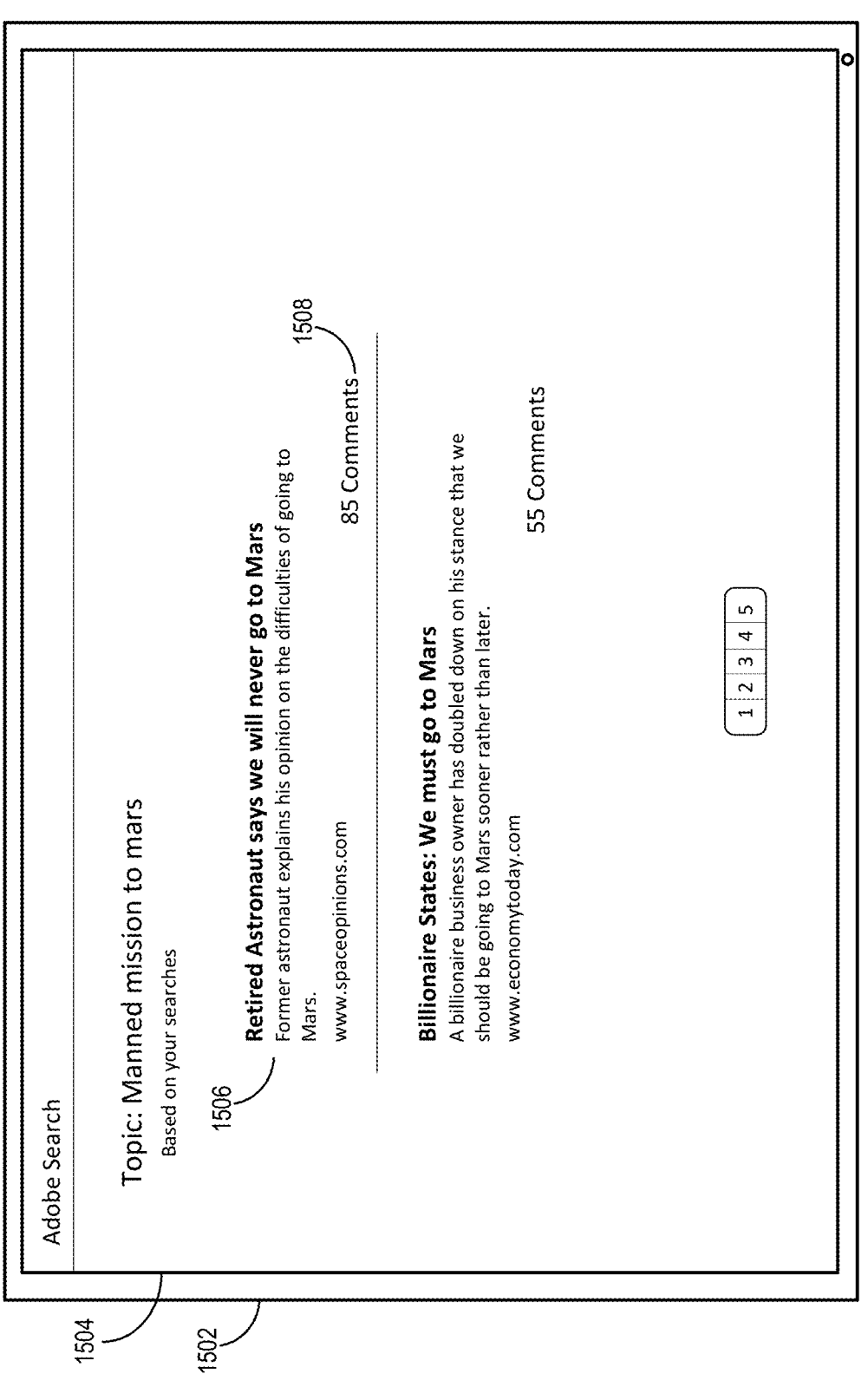
FIG. 15 illustrates a digital syntopical reading system displaying socially contextualized information for content items in accordance with one or more implementations.

In some instances, the digital syntopical reading system 106 provides, for display within a graphical user interface, an indication of socially contextualized comments or posts linked to a digital content item. For example, FIG. 15 illustrates the digital syntopical reading system 106 displaying socially contextualized information in relation to digital content items. In particular, as shown in FIG. 15, the digital syntopical reading system 106 provides, for display within a graphical user interface 1504 of a client device 1502, a digital content item 1506 relevant to a search query (e.g., as a search result). Furthermore, as shown in FIG. 15, the digital syntopical reading system 106 also utilizes social media posts and/or other comments as digital content items in claim relation graph to map viewpoints from the social media posts to claims in the digital content item 1506 (in accordance with one or more embodiments herein). Then, as shown in FIG. 15, the digital syntopical reading system 106 provides, for display within the graphical user interface 1504, an indication of comments 1508 (as the mapped social media posts).

Figure 16:
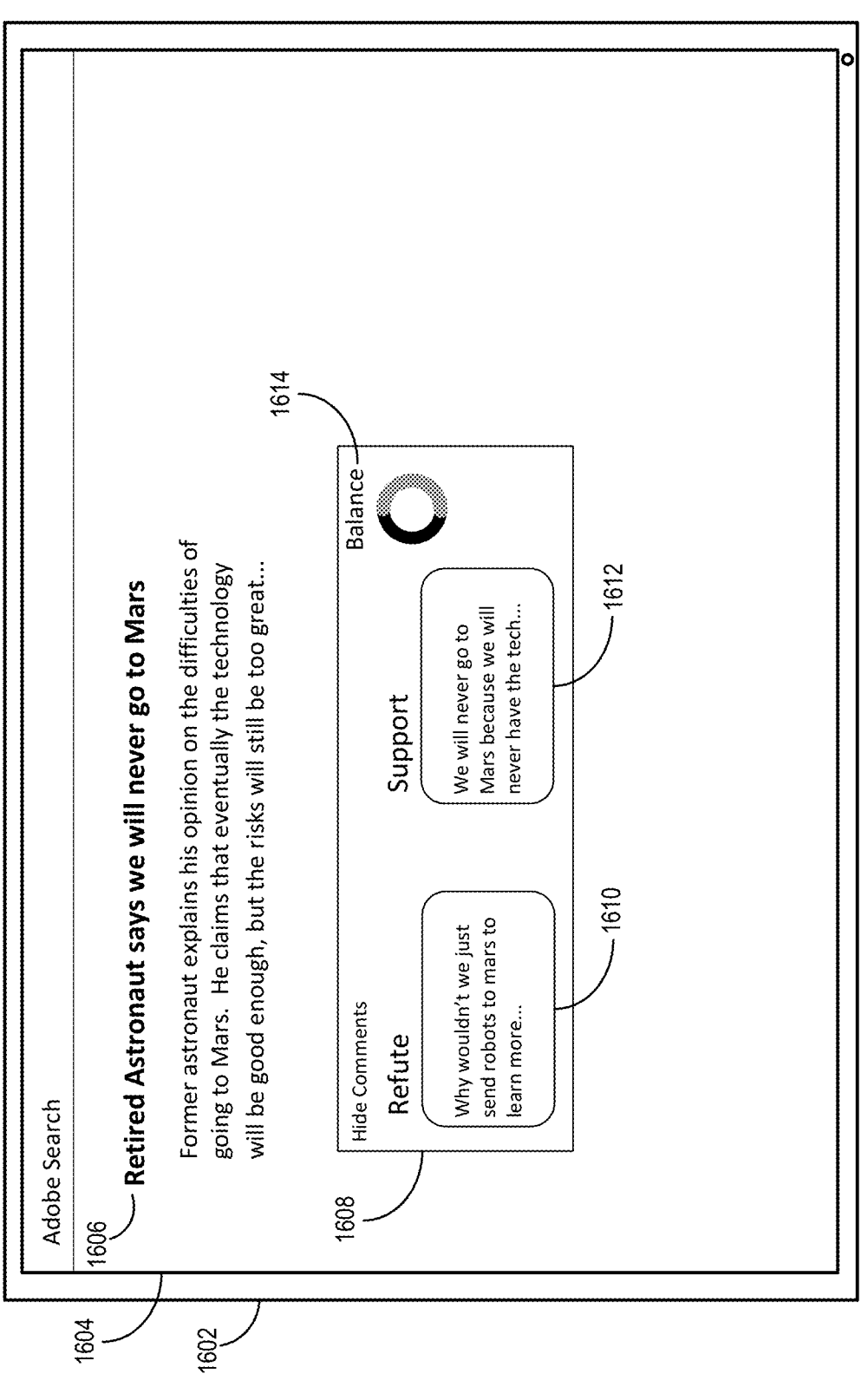
FIG. 16 illustrates a digital syntopical reading system displaying stance information from social media posts to enable socially contextualized reading of a digital content item in accordance with one or more implementations.

In one or more implementations, as mentioned above, the digital syntopical reading system 106 also utilizes the social media posts to provide a level of support from social media posts (and/or comments) to claims within a digital content item. For instance, FIG. 16 illustrates the digital syntopical reading system 106 displaying stance information from social media posts to enable socially contextualized reading of a digital content item. In particular, FIG. 16 illustrates the digital syntopical reading system 106 utilizes viewpoints data extracted for social media posts (and/or other comments) in accordance with one or more embodiments herein to display stance information from the social media posts in relation to claims in a digital content item.

Indeed, as shown in FIG. 16, the digital syntopical reading system 106 provides, for display within a graphical user interface 1604 in a client device 1602, comments 1608 derived from social media posts for claims in a digital content item 1606. For instance, as shown in FIG. 16, the digital syntopical reading system 106 displays a social media post 1610 having a negative stance towards the claims in the digital content item 1606. In addition, as shown in FIG. 16, the digital syntopical reading system 106 displays a social media post 1612 having a positive stance towards the claims in the digital content item 1606. In some cases, the social media posts are directly mapped to individual claims in a digital content item. Furthermore, as shown in FIG. 16, the digital syntopical reading system 106 also displays a graphical user element 1614 indicating a stance distribution (as described above) from social media posts in relation to the claims (or claim) in the digital content item 1606. In one or more embodiments, the digital syntopical reading system 106 displays various numbers of social media posts with negative and/or positive stances towards claims in a digital content item (e.g., for one or more aspects detected in the digital content item).

In one or more embodiments, the digital syntopical reading system 106 displays socially contextualized comments (e.g., social media posts and/or other comments) in association with claims from a digital content item in various formats. For example, the digital syntopical reading system 106 utilizes an overlay socially contextualized comments on spans of text within a digital content item. In some cases, the digital syntopical reading system 106 utilizes a side bar portion of a digital content item to indicate socially contextualized comments to various spans of text within the digital content item. In one or more embodiments, the digital syntopical reading system 106 displays links with claims in the digital content item to navigate to a display that includes various socially contextualized comments corresponding to the particular claims within the digital content item.

In some embodiments, the digital syntopical reading system 106 utilizes determined viewpoint data for claims in a digital content item to link claims within the digital content item. For instance, the digital syntopical reading system 106 identifies multiple claims in a digital content item that are associated with the same viewpoint (e.g., same aspect and/or stance). Then, in one or more embodiments, the digital syntopical reading system 106 displays the intra-digital content item claims having the same viewpoint in association with a user selected claim (and/or user hovered claim) in the digital content item. In some cases, the digital syntopical reading system 106 displays a link in association with the particular claim to navigate to the intra-digital content item claims having the same viewpoint as the particular claim.

Additionally, in one or more embodiments, the digital syntopical reading system 106 utilizes syntopical reading (via viewpoint reconstruction as described above) within various applications. For instance, in some cases, the digital syntopical reading system 106 utilizes syntopical reading to verify (or contextualize) statements generated by a machine learning model. For instance, many machine learning models utilize techniques to generate text-based responses to prompts (e.g., ChatGPT, chatbot language models).

In one or more embodiments, the digital syntopical reading system 106 utilizes statements (or claims) from the machine learning model as queries to contextualize the statements using a content collection. For instance, the digital syntopical reading system 106 determines viewpoints from the claims generated by the machine learning model and matches the viewpoints determined from the content collection (as described above with reference to social contextualization). Then, in one or more cases, the digital syntopical reading system 106 maps the viewpoints from the content collection to the claims generated by the machine learning model to provide (and/or display) support and/or rebuttals for the claims generated by the machine learning model.

In some cases, the digital syntopical reading system 106 utilizes statements (or claims) identified within a document (or digital content) editor as queries to contextualize the statements using a content collection. For example, the digital syntopical reading system 106 identifies claims input by a user within a digital content editor (e.g., a digital content item being typed or created) and determines viewpoints for the claims to match the viewpoints to viewpoints determined from the content collection (as described above with reference to social contextualization). Furthermore, in one or more implementations, the digital syntopical reading system 106 maps the viewpoints from the content collection to the claims (or statements) identified within the digital content editor to provide (and/or display) support and/or rebuttals for the claims.

In addition, in one or more embodiments, the digital syntopical reading system 106 utilizes syntopical reading (via viewpoint reconstruction as described above) to analyze user feedback. For example, the digital syntopical reading system 106 extracts claims (or statements) from user feedback (e.g., customer reviews, survey feedback) and extracts viewpoint information for the claims from the user feedback in accordance with one or more embodiments herein. Then, in one or more embodiments, the digital syntopical reading system 106 utilizes the extracted viewpoints from the user feedback to display topics discussed within user feedback, aspects discussed within user feedback, and stances from the user feedback. For instance, in some cases, the digital syntopical reading system 106 maps the viewpoints from the user feedback to a product and/or subject having a similar topic to the topics identified within the viewpoints from the user feedback (e.g., mapping viewpoints on a product review to a product).

As mentioned above, the digital syntopical reading system 106 accurately and efficiently constructs claim relation graphs for viewpoint reconstruction. To illustrate, experimenters utilized an implementation of the digital syntopical reading system (as described above) to compare results with various conventional digital content analysis systems. For example, experimenters performed experiments to compare the computational speed of utilizing an implementation of the digital syntopical reading system (with sentence transformers) to construct a claim relation graph in comparison to conventional digital content analysis systems that utilize cross encoders for claim relation graph construction. Indeed, the time to create a claim relation graph was faster using an implementation of the digital syntopical reading system in comparison to the conventional digital content analysis systems that utilize cross encoders for claim relation graph construction. In particular, the conventional digital content analysis systems performed with an exponential growth in time as the number of claims scaled, whereas the implementation of the digital syntopical reading system performed with a logarithmic growth in time as the number of claims scaled. In many cases, the implementation of the digital syntopical reading system constructed claim relation graphs within seconds. In contrast, conventional digital content analysis systems required several hours to construct claim relation graphs.

Furthermore, the experimenters utilized 10 stance datasets, each with a different set of topics and labels to obtain stance detection benchmarks. In particular, the experimenters utilized a subset of datasets that were related to binary stance detection. Indeed, the experimenters utilized the IBM Claim-Stance dataset, the SemEval-2016 Task 6 dataset, the Stance Classification Dataset, the Internet Argument Corpus V1, the SemEval-2019 Task 7 dataset, the UKP Sentential Argumentation Mining dataset, the PERSPECTRUM dataset, the Argument Reasoning Comprehension Task dataset, the Snopes dataset, and the Fake News Challenge dataset for stance detection benchmarks.

Additionally, for the stance detection benchmarks, the experimenters utilized various baseline models, such as MT-DNN, BERT large model (as described in Schiller), RoBERTa Base/Large model, and a RoBERTa Base/Large MNLI model (as described by Schiller et al. in Stance Detection Benchmark: How Robust is Your Stance Detection?, Künstl Intell 35, 329-341 (2021). https://doi.org/10.1007/s13218-021-00714-w). In one or more of the baseline models, the experimenters performed stance detection using claim relation graph construction and edge weighted graph neural networks (via an implementation of the digital syntopical reading system) in comparison to cross encoders. Furthermore, the experimenters utilized a macro-averaged $F_1$ score for stance classifications on the above-mentioned datasets.

Results of macro-averaged $F_1$ score for stance classifications on various datasets from the above-mentioned datasets using implementations of the digital syntopical reading system (as described above) and using various conventional digital content analysis systems is shown in FIG. 17. In addition, FIG. 17 illustrates shaded columns for datasets that match the format of viewpoint reconstruction (unseen topics, binary stance) utilized in one or more implementations of the digital syntopical reading system. Indeed, as shown in FIG. 17, implementations of stance detection utilizing a claim relation graph constructed in accordance with one or more implementations herein (e.g., C-R graph of sentence) performed similarly to implementations of stance detection utilizing claim relation graphs constructed using cross encoder approaches (e.g., C-R graph of cross). Furthermore, an implementation of the digital syntopical reading system which utilizes sentence transformers for claim relation graph construction and an EGAT for stance classification resulted in higher average scores compared to other implementations (as shown in FIG. 17).

In addition, as shown in FIG. 17, an indication of "dnf" indicates that construction of a claim relation graph took longer than the allowed computation budget of 72 hours per dataset. Indeed, as shown in FIG. 17, implementations of stance detection utilizing a claim relation graph constructed in accordance with one or more implementations herein (e.g., C-R graph of sentence) resulted in accurate performance while also taking no longer than 30 minutes per dataset. The table shown in FIG. 17 also illustrates a gain in accuracy for many datasets by utilizing an EGAT implementation for the edge weighted graph neural network (in accordance with one or more implementations herein) in comparison to a convolutional graph neural network.

Additionally, for evaluating clustering-based aspect detection, experimenters utilized argument frames dataset from Ajjour et al., Modeling Frames in Argumentation. In Proceedings of the 2019 Conference on Empirical Methods in Natural Language Processing and the 9th International Joint Conference on Natural Language Processing (EMNLP-IJCNLP), pages 2922-2932, Hong Kong, China. Indeed, the argument frames dataset contains approximately 11k sentences drawn from 465 different topics. The sentences come from the website Debatepedia, and each topic is a different Debatepedia page. Each sentence has a specific aspect (or frame) drawn from a set of over a thousand possible aspects. The experimenters evaluated, with a clustering metric, b-cubed $F_1$ results. For example, the experimenters used a b-cubed precision (b-cubed P) that is calculated per item as a number of items in the same cluster that belong together are divided by the total number of items in the cluster and a b-cubed recall (b-cubed R) that is calculated per-item as the number of items in the same cluster that belong together divided by the total number of items that belong together. Furthermore, the experimenters constructed a held-out test set of 45 topics in order to select for parameters, such as the number of topics in a topic model or a threshold for claim relation graphs.

Additionally, as a baseline model, the experimenters used Latent Dirichlet Allocation (LDA) model (e.g., MALLET) to build topic models over a dataset (while choosing an optimal number of topics based a held-out set of topics). Furthermore, for baseline clustering, the experimenters used sentence transformers (as described herein) to encode claims and utilized spectral clustering to cluster claims into aspects. During the evaluation, the experimenters compared the aspect clustering baseline model to an implementation of the digital syntopical reading system (e.g., using a claim relation graph with modularity-based community detection as described above) while using a positive weighted graph version of the claim relation graph (e.g., having an average absolute value of weights for edges). Indeed, as shown in the following table, the implementation of the digital syntopical reading system (e.g., using a claim relation graph with modularity-based community detection as described above) outperformed the LDA-based and RoBERTa Large MNLI Clustering approaches (e.g., a higher b-cubed $F_1$, b-cubed P, and b-cubed R indicating more claims were being correctly clustered together without hurting recall).

TABLE 1

| Model | b-cubed $F_1$ | b-cubed P | b-cubed R |
|---|---|---|---|
| LDA | 47.01 | 47.19 | 49.82 |
| Clustering (RoBERTa Large MNLI) | 45.69 | 44.76 | 50.15 |
| Claim-Relation Graphs (Modularity) | 55.42 | 66.11 | 53.82 |

Figure 18:
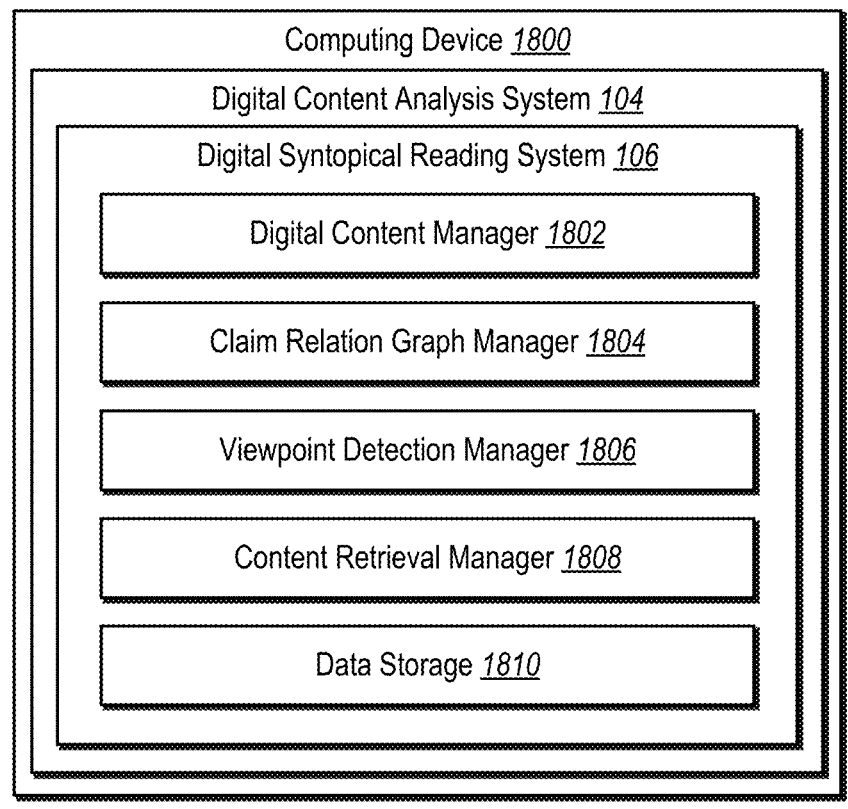
FIG. 18 illustrates a schematic diagram of a digital syntopical reading system in accordance with one or more implementations.

Turning now to FIG. 18, additional detail will be provided regarding components and capabilities of one or more embodiments of the digital syntopical reading system. In particular, FIG. 18 illustrates an example digital syntopical reading system 106 executed by a computing device(s) 1800 (e.g., the server device(s) 102, the client device 110, and/or the digital content repository 114). As shown by the embodiment of FIG. 18, the computing device(s) 1800 includes or hosts the digital content analysis system 104 and the digital syntopical reading system 106. Furthermore, as shown in FIG. 18, the digital content analysis system 104 includes a digital content manager 1802, a claim relation graph manager 1804, a viewpoint detection manager 1806, a content retrieval manager 1808, and data storage 1810.

As just mentioned, and as illustrated in the embodiment of FIG. 18, the digital syntopical reading system 106 includes the digital content manager 1802. For example, the digital content manager 1802 stores and/or identifies digital content items as described above (e.g., in reference to FIGS. 1-4 and 8-16). Indeed, in one or more embodiments, the digital content manager 1802 provides digital content items for viewpoint extraction and/or in response to queries (for content retrieval applications) as described above (e.g., in relation to FIGS. 1-4 and 8-16).

Moreover, as shown in FIG. 18, the digital syntopical reading system 106 includes the claim relation graph manager 1804. In some embodiments, the claim relation graph manager 1804 utilizes claims extracted from one or more digital content items to generate (or construct) a claim relation graph with claim nodes and relational edges between the claim nodes as described above (e.g., in reference to FIGS. 2-5). Indeed, in one or more implementations, the claim relation graph manager 1804 utilizes sentence transformers to embed claims as claim nodes and utilizes approximate nearest neighbor searches to generate relational edges between the claim nodes (via a vector similarity operation) as described above (e.g., in reference to FIGS. 2-5).

Furthermore, as shown in FIG. 18, the digital syntopical reading system 106 includes the viewpoint detection manager 1806. In particular, in one or more implementations, the viewpoint detection manager 1806 utilizes an edge-weighted graph neural network with attention transformers to determine stance labels for claims in a claim relation graph to generate viewpoints as described above (e.g., in reference to FIGS. 2, 3, 6, and 7). In addition, in one or more embodiments, the viewpoint detection manager 1806 also determines aspects and topics for claims to generate viewpoints as described above (e.g., in reference to FIGS. 2, 3, 6, and 7).

Additionally, as shown in FIG. 18, the digital syntopical reading system 106 includes the content retrieval manager 1808. In one or more implementations, the content retrieval manager 1808 provides content ranked based on the viewpoints in response to a search query (e.g., to present viewpoints with the search results) as described above (e.g., in reference to FIGS. 2-3 and 8-13). Moreover, in one or more embodiments, the digital syntopical reading system 106 socially contextualize claims from digital content to present viewpoints from social media posts in relation to claims in the digital content as described above (e.g., in reference to FIGS. 3-4 and 14-16).

As further shown in FIG. 18, the digital syntopical reading system 106 includes the data storage 1810. In some embodiments, the data storage 1810 maintains data to perform one or more functions of the digital syntopical reading system 106. For example, the data storage 1810 includes digital content items, claims, viewpoints, claim relation graphs, sentence transformer models, and/or graph neural network models.

Each of the components 1802-1810 of the computing device(s) 1800 (e.g., the computing device(s) 1800 implementing the digital syntopical reading system 106), as shown in FIG. 18, may be in communication with one another using any suitable technology. The components 1802-1810 of the computing device(s) 1800 can comprise software, hardware, or both. For example, the components 1802-1810 can comprise one or more instructions stored on a computer-readable storage medium and executable by processor of one or more computing devices. When executed by the one or more processors, the computer-executable instructions of the digital syntopical reading system 106 (e.g., via the computing device(s) 1800) can cause a client device and/or server device to perform the methods described herein. Alternatively, the components 1802-1810 and their corresponding elements can comprise hardware, such as a special purpose processing device to perform a certain function or group of functions. Additionally, the components 1802-1810 can comprise a combination of computer-executable instructions and hardware.

Furthermore, the components 1802-1810 of the digital syntopical reading system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1802-1810 may be implemented as a stand-alone application, such as a desktop or mobile application. Furthermore, the components 1802-1810 may be implemented as one or more web-based applications hosted on a remote server. The components 1802-1810 may also be implemented in a suite of mobile device applications or "apps." To illustrate, the components 1802-1810 may be implemented in an application, including but not limited to, ADOBE ANALYTICS CLOUD, ADOBE ANALYTICS, ADOBE AUDIENCE MANAGER, ADOBE CAMPAIGN, or ADOBE EXPERIENCE MANAGER. The foregoing are either registered trademarks or trademarks of Adobe Inc. in the United States and/or other countries.

FIGS. 1-18, the corresponding text, and the examples provide a number of different methods, systems, devices, and non-transitory computer-readable media of the digital syntopical reading system 106. In addition to the foregoing, one or more embodiments can also be described in terms of flowcharts comprising acts for accomplishing a particular result, as shown in FIG. 19. The acts shown in FIG. 19 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 19. In some embodiments, a system can be configured to perform the acts of FIG. 19. Alternatively, the acts of FIG. 19 can be performed as part of a computer implemented method.

As mentioned above, FIG. 19 illustrates a flowchart of a series of acts 1900 for extracting cross-content viewpoints from a content collection for syntopical reading using an efficient claim-relation graph construction approach in accordance with one or more implementations. While FIG. 19 illustrates acts according to one embodiment, alternative embodiments may omit, add to, reorder, and/or modify any of the acts shown in FIG. 19.

As shown in FIG. 19, the series of acts 1900 include an act 1902 of identifying claims from content item(s), an act 1904 of extracting viewpoint(s) from content item(s) with an act 1906 of generating a claim relation graph and an act 1908 of utilizing a claim relation graph with a graph neural network, and an act 1910 of displaying viewpoint(s) and content item(s).

In particular, in some cases, the act 1902 includes identifying a set of claims from a collection of content items, the act 1904 includes extracting viewpoint(s) from content item(s) through an act 1906 of generating a claim relation graph from the set of claims comprising claim nodes and pairwise relationship edges between the claim nodes utilizing approximate nearest neighbor searches and an act 1908 of determining a viewpoint for a content item from the claim relation graph for the query utilizing an edge weighted graph neural network (in response to identifying a query for content items), and the act 1910 includes providing, for display within a graphical user interface, a representation of the content item and viewpoint information from the viewpoint for the content item.

In one or more embodiments, the act 1902 includes receiving a query for content items and identifying a set of claims from a collection of content items, the act 1904 includes extracting viewpoint(s) from content item(s) through an act 1906 of generating a claim relation graph comprising claim nodes and pairwise relationship edges between the claim nodes by embedding claims from the set of claims within a metric space utilizing sentence transformers to generate a set of claim nodes and utilizing an approximate nearest neighbor search to generate a set of pairwise relationship edges between a claim node and a subset of claim nodes from the set of claim nodes and an act 1908 of determining a viewpoint for a content item corresponding to the claim node from the claim relation graph for the query (in response to receiving the query), and an act 1910 of providing, for display within a graphical user interface, a representation of the content item and viewpoint information from the viewpoint for the content item.

Moreover, in some implementations, the act 1902 includes identifying a set of claims from a collection of content items, the act 1904 includes extracting viewpoint(s) from content item(s) through an act 1906 of generating a claim relation graph from the set of claims comprising claim nodes and pairwise relationship edges between the claim nodes and an act 1908 of, in response to identifying a query, determining a viewpoint indicating a topic, stance, and aspect for a content item from the claim relation graph by determining the topic utilizing a cluster of claims nodes identified from the content item within the claim relation graph and generating the stance and the aspect for the topic utilizing an edge weighted graph neural network with the claim relation graph, and the act 1910 includes providing, for display within the graphical user interface, a second graphical user element indicating a viewpoint coverage for the content item.

Furthermore, in one or more embodiments, the series of acts 1900 include generating the pairwise relationship edges between the claim nodes by embedding the set of claims within a metric space utilizing sentence transformers to generate the claim nodes and comparing a claim node from the claim nodes to an approximate nearest neighbor claim node to generate an edge between the claim node and the approximate nearest neighbor claim node utilizing a vector similarity operation. In one or more embodiments, the series of acts 1900 include generating the claim relation graph from the set of claims by utilizing sentence transformers to embed the set of claims within a metric space as claim nodes and generating the pairwise relationship edges between the claim nodes using approximate nearest neighbor searches. In some cases, the series of acts 1900 include generating a pairwise cosine similarity distance between the claim node and the approximate nearest neighbor claim node for the edge. In one or more embodiments, the series of acts 1900 include utilizing the approximate nearest neighbor search to identify the claim node and the subset of claim nodes in relation to the query.

Additionally, in some cases, the series of acts 1900 include utilizing an edge weighted graph neural network to determine the viewpoint (wherein the viewpoint includes a topic, an aspect, and a stance for a claim corresponding to the content item). In some instances, the series of acts 1900 include utilizing the edge weighted graph neural network with concatenated edge attention heads within the edge weighted graph neural network. Furthermore, in some cases, the series of acts 1900 include utilizing the edge weighted graph neural network with layer normalization between attention transformer layers of the edge weighted graph neural network.

Moreover, in one or more embodiments, the series of acts 1900 include utilizing the edge weighted graph neural network to generate a stance prediction for a claim corresponding to a claim node from the claim relation graph and determining a stance for the viewpoint utilizing the stance prediction. In some cases, the series of acts 1900 include determining an aspect for a claim corresponding to a claim node for the viewpoint utilizing the claim relation graph. Furthermore, in one or more implementations, the series of acts 1900 include determining a topic of the viewpoint by identifying a central claim from a cluster of claim nodes in the claim relation graph. Additionally, in some instances, in the series of acts 1900, content items include text documents, social media posts, or digital media transcriptions.

Additionally, in some instances, the series of acts 1900 include selecting the viewpoint based on a comparison with the query and identifying the content item utilizing a claim node corresponding to the viewpoint. In one or more embodiments, the series of acts 1900 include receiving a search engine input as the query and providing, for display within the graphical user interface, the representation of the content item and the viewpoint information within a search engine result. In some cases, the series of acts 1900 include providing, for display within the graphical user interface, a social media post as the representation of the content item and the viewpoint information indicating content from the social media post (wherein a query comprises a statement from a text document). In one or more instances, the series of acts 1900 include providing, for display within the graphical user interface, a social media post as a content item and the viewpoint indicating the topic, the stance, and the aspect for the social media post (wherein a query comprises a statement from a text document).

In some embodiments, the series of acts 1900 include utilizing the viewpoint to rank the content item within the collection of content items and providing, for display within the graphical user interface, the representation of the content item and the viewpoint information based on the rank of the content item. Additionally, the series of acts 1900 include providing, for display within the graphical user interface, the representation of the content item and the viewpoint information for the content item by providing, for display within the graphical user interface, a link to the content item as the representation of the content item, providing, for display within the graphical user interface, a first graphical user element indicating a stance distribution from one or more viewpoints corresponding to the content item, and/or providing, for display within the graphical user interface, a second graphical user element indicating a viewpoint coverage for the content item.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 20:
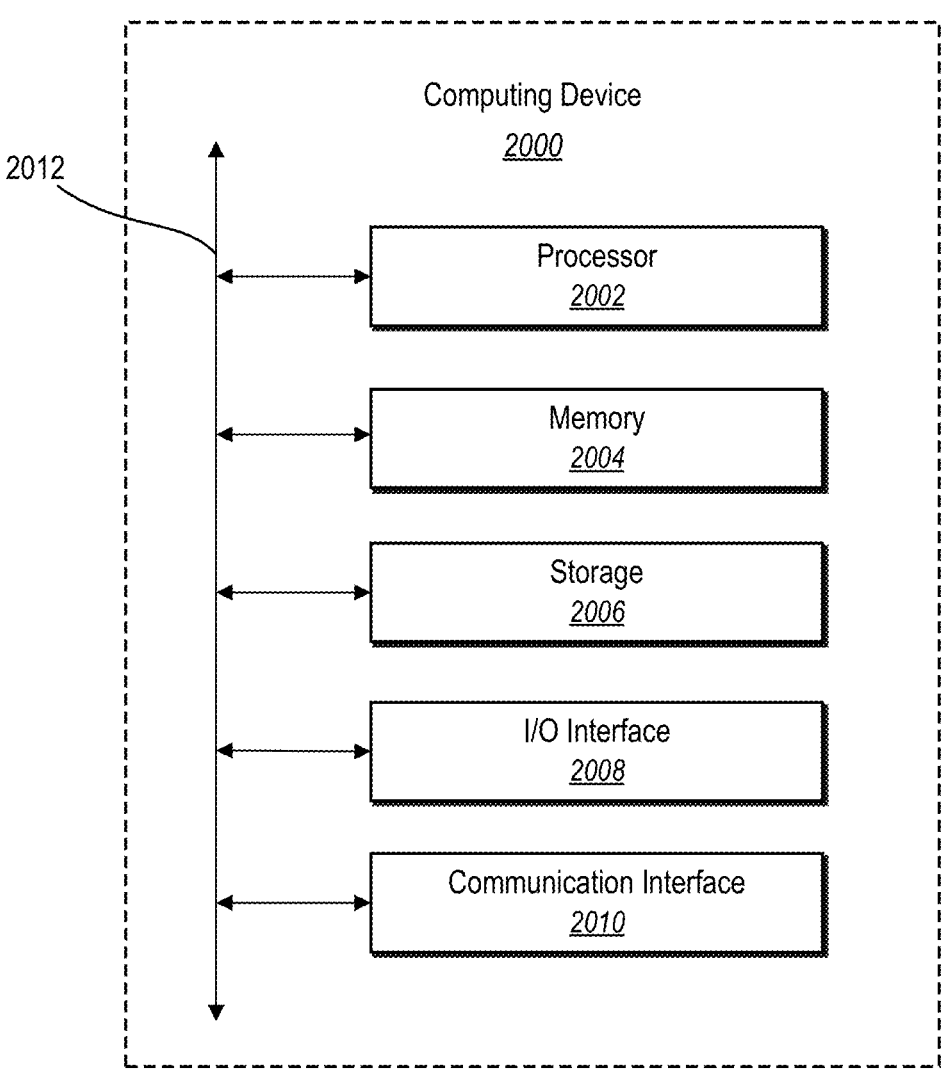
FIG. 20 illustrates a block diagram of an example computing device in accordance with one or more implementations.

FIG. 20 illustrates a block diagram of an example computing device 2000 that may be configured to perform one or more of the processes described above. One will appreciate that one or more computing devices, such as the computing device 2000 may represent the computing devices described above (e.g., the server device(s) 102, the client device 110, and/or the digital content repository 114). In one or more implementations, the computing device 2000 may be a mobile device (e.g., a mobile telephone, a smartphone, a PDA, a tablet, a laptop, a camera, a tracker, a watch, a wearable device, etc.). In some implementations, the computing device 2000 may be a non-mobile device (e.g., a desktop computer or another type of client device). Further, the computing device 2000 may be a server device that includes cloud-based processing and storage capabilities.

As shown in FIG. 20, the computing device 2000 can include one or more processor(s) 2002, memory 2004, a storage device 2006, input/output interfaces 2008 (or "I/O interfaces 2008"), and a communication interface 2010, which may be communicatively coupled by way of a communication infrastructure (e.g., bus 2012). While the computing device 2000 is shown in FIG. 20, the components illustrated in FIG. 20 are not intended to be limiting. Additional or alternative components may be used in other implementations. Furthermore, in certain implementations, the computing device 2000 includes fewer components than those shown in FIG. 20. Components of the computing device 2000 shown in FIG. 20 will now be described in additional detail.

In particular implementations, the processor(s) 2002 includes hardware for executing instructions, such as those making up a computer program. As an example, and not by way of limitation, to execute instructions, the processor(s) 2002 may retrieve (or fetch) the instructions from an internal register, an internal cache, memory 2004, or a storage device 2006 and decode and execute them.

The computing device 2000 includes memory 2004, which is coupled to the processor(s) 2002. The memory 2004 may be used for storing data, metadata, and programs for execution by the processor(s). The memory 2004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 2004 may be internal or distributed memory.

The computing device 2000 includes a storage device 2006 includes storage for storing data or instructions. As an example, and not by way of limitation, the storage device 2006 can include a non-transitory storage medium described above. The storage device 2006 may include a hard disk drive ("HDD"), flash memory, a Universal Serial Bus ("USB") drive or a combination these or other storage devices.

As shown, the computing device 2000 includes one or more I/O interfaces 2008, which are provided to allow a user to provide input to (such as user strokes), receive output from, and otherwise transfer data to and from the computing device 2000. These I/O interfaces 2008 may include a mouse, keypad or a keyboard, a touch screen, camera, optical scanner, network interface, modem, other known I/O devices or a combination of such I/O interfaces 2008. The touch screen may be activated with a stylus or a finger.

The I/O interfaces 2008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 2008 are configured to provide graphical data to a display for presentation to a user. The graphical data may be representative of one or more graphical user interfaces and/or any other graphical content as may serve a particular implementation.

The computing device 2000 can further include a communication interface 2010. The communication interface 2010 can include hardware, software, or both. The communication interface 2010 provides one or more interfaces for communication (such as, for example, packet-based communication) between the computing device and one or more other computing devices or one or more networks. As an example, and not by way of limitation, communication interface 2010 may include a network interface controller ("NIC") or network adapter for communicating with an Ethernet or other wire-based network or a wireless NIC ("WNIC") or wireless adapter for communicating with a wireless network, such as a WI-FI. The computing device 2010 can further include a bus 2012. The bus 2012 can include hardware, software, or both that connects components of the computing device 2000 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating claim nodes representing a set of claims from a collection of content items;
in response to identifying a query for content items, generating a partial claim relation graph from the query, the claim nodes, and pairwise relationship edges between a subset of the claim nodes and the query by:
generating the claim nodes by utilizing a sentence transformer to generate metric space claim embeddings from the set of claims within a metric space;

generating one or more query nodes by generating metric space query embeddings from the query within the metric space; and
generating, according to the query, the pairwise relationship edges only between the subset of the claim nodes and the one or more query nodes utilizing approximate nearest neighbor searches between the claim nodes and the one or more query nodes in the metric space;
determining a viewpoint for a content item from the partial claim relation graph for the query utilizing an edge weighted graph neural network with the pairwise relationship edges between the subset of the claim nodes of the metric space claim embeddings and the one or more query nodes of the metric space query embeddings; and
providing, for display within a graphical user interface, a representation of the content item and viewpoint information from the viewpoint for the content item.

2. The computer-implemented method of claim 1, further comprising generating the pairwise relationship edges between the claim nodes by comparing a claim node from the claim nodes to an approximate nearest neighbor claim node to generate an edge between the claim node and the approximate nearest neighbor claim node utilizing a vector similarity operation that captures relationships between the claim nodes and the one or more query nodes according to spatial distances between the claim nodes and the one or more query nodes.

3. The computer-implemented method of claim 2, further comprising generating a pairwise cosine similarity distance between the claim node and the approximate nearest neighbor claim node for the edge.

4. The computer-implemented method of claim 1, further comprising generating a relationship graph by:
identifying, utilizing a natural language processor, the set of claims including sentences of the collection of content items that convey one or more of a thought, argument, statement or assertion; and
generating, utilizing the sentence transformer, the metric space claim embeddings by encoding the set of claims within the metric space.

5. The computer-implemented method of claim 1, further comprising determining a topic of the viewpoint by identifying a central claim from a cluster of claim nodes in the partial claim relation graph.

6. The computer-implemented method of claim 1, further comprising:
utilizing the edge weighted graph neural network to generate a stance prediction for a claim corresponding to a claim node from the partial claim relation graph; and
determining a stance for the viewpoint utilizing the stance prediction.

7. The computer-implemented method of claim 1, further comprising determining an aspect for a claim corresponding to a claim node for the viewpoint utilizing the partial claim relation graph.

8. The computer-implemented method of claim 1, further comprising:
selecting the viewpoint based on a comparison with the query; and
identifying the content item utilizing a claim node corresponding to the viewpoint.

9. The computer-implemented method of claim 1, further comprising:
receiving a search engine input as the query; and providing, for display within the graphical user interface, the representation of the content item and the viewpoint information within a search engine result.

10. A non-transitory computer-readable medium storing instructions that, when executed by at least one processor, cause the at least one processor to perform operations comprising:

receiving a query for content items;

generating a set of claim nodes representing a set of claims from a collection of content items;

generating a partial claim relation graph comprising the set of claim nodes, the query, and pairwise relationship edges between a subset of claim nodes of the set of claim nodes and the query by:

generating metric space claim embeddings from the set of claims within a metric space utilizing sentence transformers to generate the set of claim nodes;

generating one or more query nodes by generating metric space query embeddings from the query within the metric space; and utilizing an approximate nearest neighbor search to generate a set of pairwise relationship edges only between the one or more query nodes and the subset of claim nodes;

in response to receiving the query, determining a viewpoint for a content item corresponding to a claim node from the partial claim relation graph for the query by utilizing an edge weighted graph neural network with the pairwise relationship edges between the subset of claim nodes of the metric space claim embeddings and the one or more query nodes of the metric space query embeddings; and providing, for display within a graphical user interface, a representation of the content item and viewpoint information from the viewpoint for the content item.

11. The non-transitory computer-readable medium of claim 10, wherein the query comprises a statement from a text document and the operations further comprise providing, for display within the graphical user interface, a social media post as the representation of the content item and the viewpoint information indicating content from the social media post.

12. The non-transitory computer-readable medium of claim 10, wherein the operations further comprise utilizing the approximate nearest neighbor search to identify the claim node and the subset of claim nodes in relation to the query.

13. The non-transitory computer-readable medium of claim 10, wherein the viewpoint comprises a topic, an aspect, and a stance for a claim corresponding to the content item.

14. The non-transitory computer-readable medium of claim 10, wherein the operations further comprise:

utilizing the viewpoint to determine a rank of the content item within the collection of content items; and providing, for display within the graphical user interface, the representation of the content item and the viewpoint information based on the rank of the content item.

15. The non-transitory computer-readable medium of claim 10, wherein the operations further comprise providing, for display within the graphical user interface, the representation of the content item and the viewpoint information for the content item by:

providing, for display within the graphical user interface, a link to the content item as the representation of the content item;

providing, for display within the graphical user interface, the representation of the content item and the viewpoint information within a search engine result.

providing, for display within the graphical user interface, a first graphical user element indicating a stance distribution from one or more viewpoints corresponding to the content item; and providing, for display within the graphical user interface, a second graphical user element indicating a viewpoint coverage for the content item.

16. A system comprising:

a memory component comprising a collection of content items; and a processing device coupled to the memory component, the processing device to perform operations comprising:

generating claim nodes representing a set of claims from the collection of content items;

in response to identifying a query, generating a partial claim relation graph from the query, the claim nodes, and pairwise relationship edges between a subset of claim nodes and the query by:

generating the claim nodes by utilizing a sentence transformer to generate metric space claim embeddings from the set of claims within a metric space;

generating one or more query nodes by generating metric space query embeddings from the query within the metric space; and generating, according to the query, the pairwise relationship edges only between the subset of claim nodes and the one or more query nodes utilizing approximate nearest neighbor searches between the claim nodes and the one or more query nodes in the metric space;

determining a viewpoint indicating a topic, stance, and aspect for a content item from the partial claim relation graph comprising the claim nodes and the pairwise relationship edges between the subset of claim nodes and the one or more query nodes by:

determining the topic utilizing a cluster of claims nodes identified from the content item within the partial claim relation graph; and generating the stance and the aspect for the topic utilizing an edge weighted graph neural network with the partial claim relation graph; and providing, for display within a graphical user interface, a representation of the content item and the viewpoint indicating the topic, the stance, and the aspect for the content item.

17. The system of claim 16, wherein the operations further comprise generating the pairwise relationship edges between the claim nodes utilizing pairwise cosine similarity distances between the claim nodes.

18. The system of claim 16, wherein the query comprises a statement from a text document and the operations further comprise providing, for display within the graphical user interface, a social media post as the content item and the viewpoint indicating the topic, the stance, and the aspect for the social media post.

19. The system of claim 16, wherein the operations further comprise utilizing the edge weighted graph neural network with concatenated edge attention heads within the edge weighted graph neural network.

20. The system of claim 16, wherein the operations further comprise utilizing the edge weighted graph neural network with layer normalization between attention transformer layers of the edge weighted graph neural network.

* * * * *